(12) United States Patent
Mukawa et al.

(10) Patent No.: US 8,335,040 B2
(45) Date of Patent: Dec. 18, 2012

(54) HEAD-MOUNTED DISPLAY APPARATUS

(75) Inventors: Hiroshi Mukawa, Kanagawa (JP); Akio Funanami, Saitama (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 12/604,800

(22) Filed: Oct. 23, 2009

(65) Prior Publication Data
US 2010/0103078 A1   Apr. 29, 2010

(30) Foreign Application Priority Data

Oct. 23, 2008 (JP) .............. P2008-272879

(51) Int. Cl.
*G02B 27/14* (2006.01)
*G09G 5/00* (2006.01)

(52) U.S. Cl. ........................... 359/630; 345/8
(58) Field of Classification Search .......... 359/629–631, 359/633; 345/7–9
See application file for complete search history.

(56) References Cited

U.S. PATENT DOCUMENTS

| 6,034,653 | A | * | 3/2000 | Robertson et al. | 345/8 |
| 7,391,573 | B2 | * | 6/2008 | Amitai | 359/630 |
| 7,502,168 | B2 | * | 3/2009 | Akutsu et al. | 359/573 |
| 2005/0083579 | A1 | * | 4/2005 | Volkenandt et al. | 359/630 |
| 2006/0228073 | A1 | | 10/2006 | Mukawa et al. | |
| 2007/0070504 | A1 | | 3/2007 | Akutsu et al. | |
| 2007/0070859 | A1 | | 3/2007 | Hirayama | |
| 2007/0091445 | A1 | | 4/2007 | Amitai | |
| 2007/0097513 | A1 | | 5/2007 | Amitai | |
| 2008/0239424 | A1 | | 10/2008 | Mukawa et al. | |

FOREIGN PATENT DOCUMENTS

| EP | 0763761 | 3/1997 |
| JP | 8136853 | 5/1996 |
| JP | 8136858 | 5/1996 |
| JP | 2001-228435 | 8/2001 |
| JP | 2006162767 | 6/2006 |
| JP | 2007-505353 | 3/2007 |
| JP | 200794175 | 4/2007 |
| WO | 2005-024969 A2 | 3/2005 |
| WO | 2005-093493 A1 | 10/2005 |

OTHER PUBLICATIONS

Japanese Office Action issued on Aug. 17, 2010 corresponding to Japanese Patent Appln. No. 2008-272879.

* cited by examiner

Primary Examiner — Ali M Harrington
(74) Attorney, Agent, or Firm — K&L Gates LLP

(57) ABSTRACT

A head-mounted display apparatus includes an image display device, a wearing device with which the image display device is worn on a head of an observer, and an attachment member with which the image display device is attached to the wearing device. The attachment member is capable of adjusting a position of the image display device relative to the wearing device independently in a first direction and in a second direction, the first direction being defined by a virtual line connecting centers of eyes of the observer, the second direction being perpendicular to the first direction and extending vertically with respect to the observer.

20 Claims, 16 Drawing Sheets

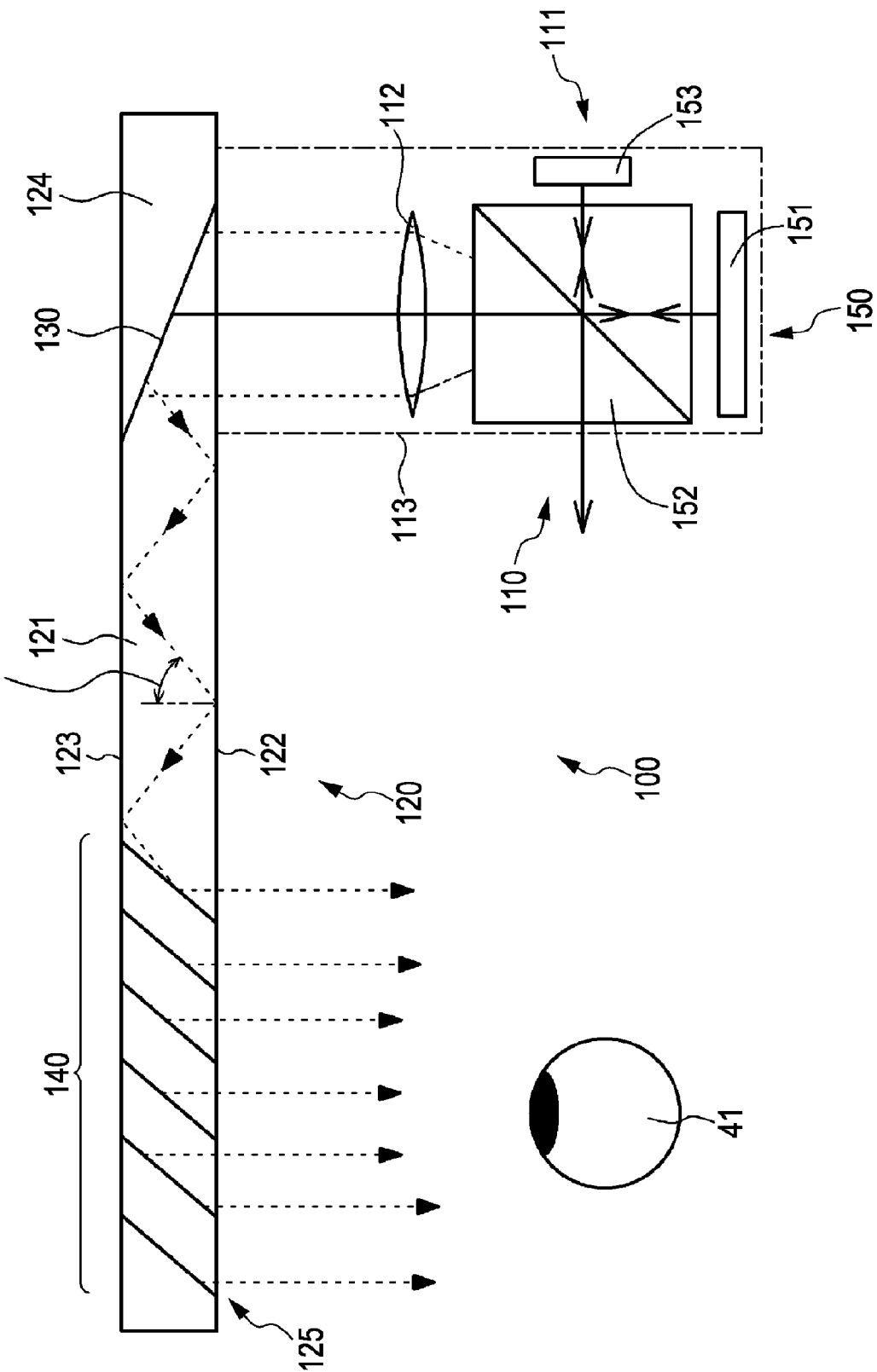

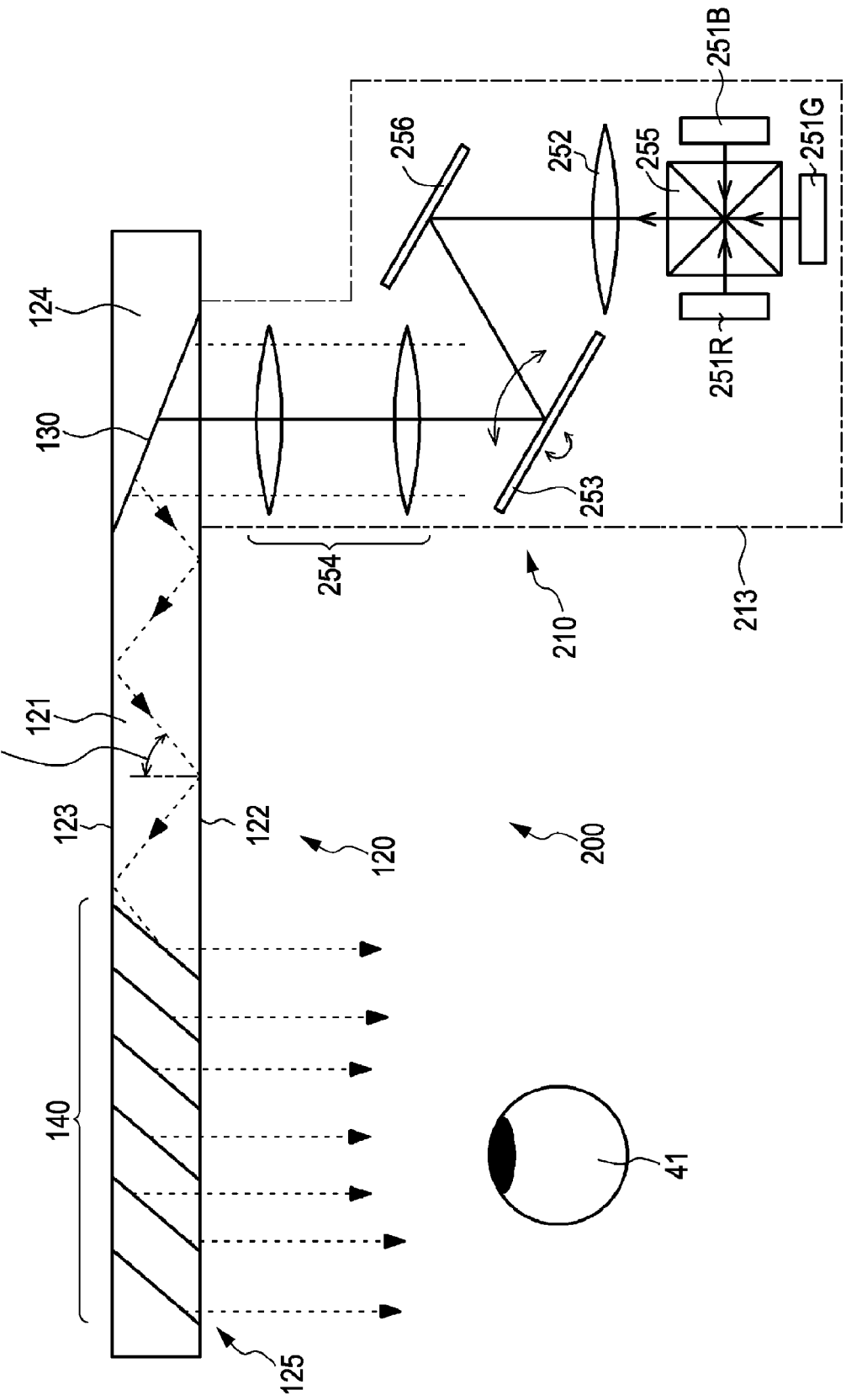

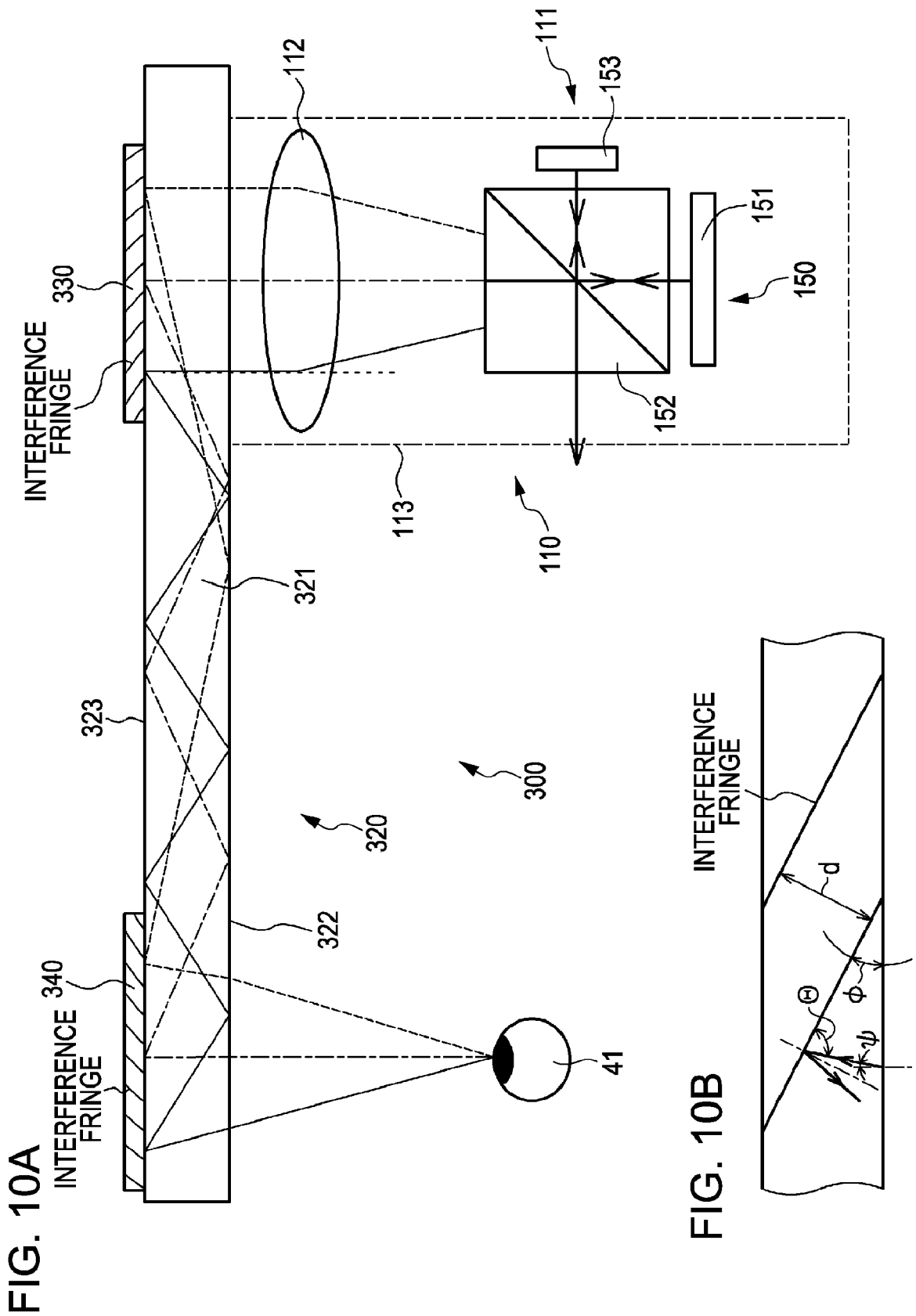

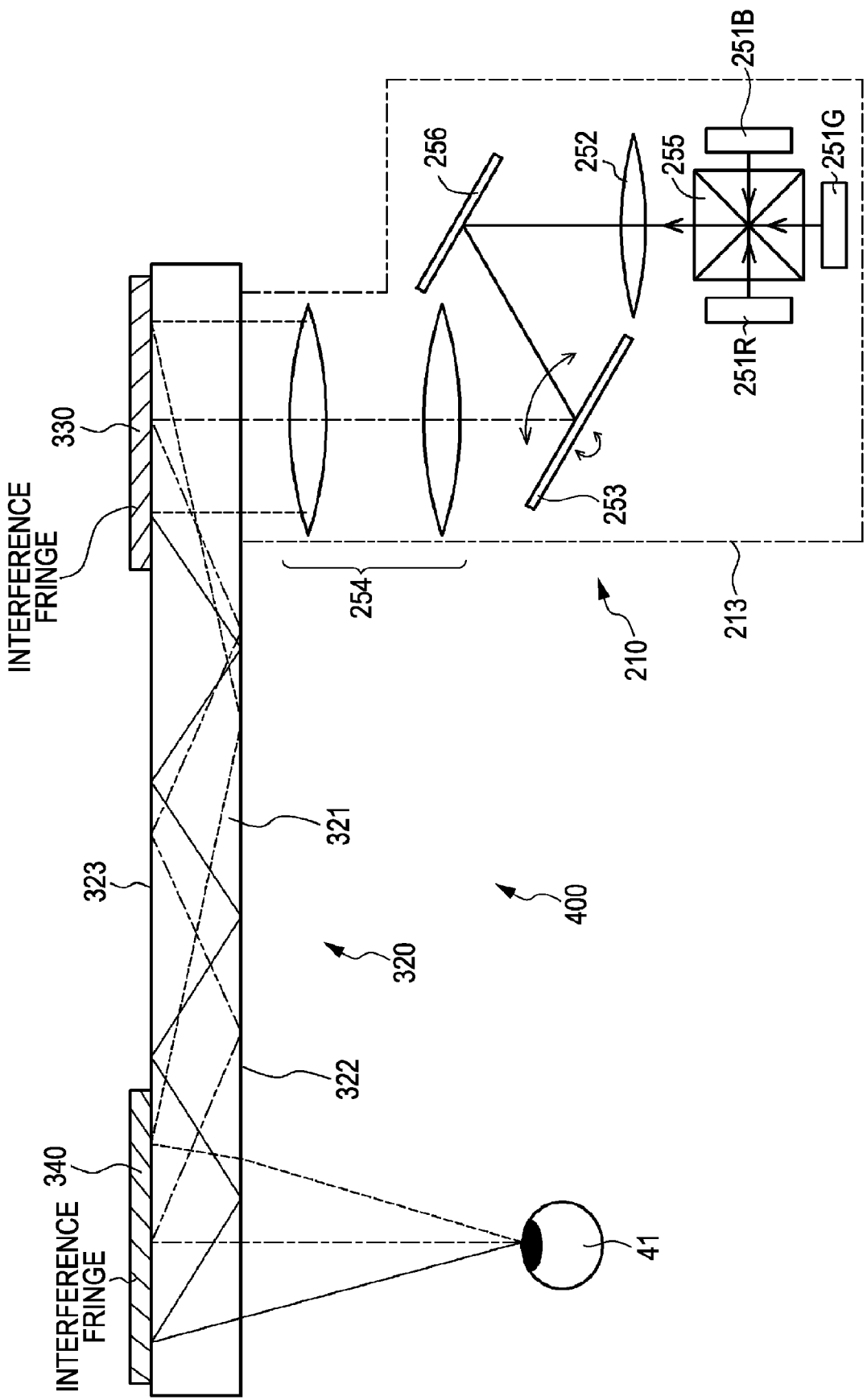

US 8,335,040 B2

HEAD-MOUNTED DISPLAY APPARATUS

CROSS REFERENCES TO RELATED APPLICATIONS

The present application claims priority to Japanese Priority Patent Application JP 2008-272879 filed in the Japan Patent Office on Oct. 23, 2008, the entire content of which is hereby incorporated by reference.

BACKGROUND

The present application relates to head-mounted display apparatuses to be worn on heads of observers.

There are some virtual-image display devices (image display devices) each enabling an observer to observe a two-dimensional image formed by an image-forming device in a form of a virtual image enlarged by a virtual-image optical system, as disclosed in, for example, Japanese Unexamined Patent Application Publication No. 2006-162767.

FIG. 8 is a conceptual diagram of an exemplary image display device 100. The image display device 100 includes an image-forming device 111 having a plurality of pixels arranged in a two-dimensional matrix, a collimating optical system 112 collimating light emitted from the pixels of the image-forming device 111 into parallel light, and an optical device (light-guiding means) 120 receiving the parallel light from the collimating optical system 112, guiding the light therethrough, and outputting the light. The image-forming device 111 and the collimating optical system 112 constitute an image generator 110. The optical device 120 includes a light-guiding plate 121 causing the received light to propagate with total reflection thereinside before outputting the light, first deflecting means 130 (for example, a layer of light-reflecting film) reflecting the light received by the light-guiding plate 121 so that the light is totally reflected inside the light-guiding plate 121, and second deflecting means 140 (for example, a multilayer structure in which a number of light-reflecting films are stacked) causing the light that has propagated with total reflection inside the light-guiding plate 121 to be output from the light-guiding plate 121.

There are other virtual-image display devices (image display devices) each employing hologram diffraction gratings so that an observer can observe a two-dimensional image formed by an image-forming device in the form of a virtual image enlarged by a virtual-image optical system, as disclosed in, for example, Japanese Unexamined Patent Application Publication No. 2007-94175.

FIG. 10A is a conceptual diagram of an exemplary image display device 300. The image display device 300 basically includes the image-forming device 111 displaying an image, the collimating optical system 112, and an optical device (light-guiding means) 320 receiving light of the image displayed on the image-forming device 111 and guiding the light therethrough toward an eye 41 of an observer. The optical device 320 includes a light-guiding plate 321, and first and second diffraction grating members 330 and 340 provided on the light-guiding plate 321. The diffraction grating members 330 and 340 are reflective volume-hologram diffraction gratings. The collimating optical system 112 receives light emitted from the pixels of the image-forming device 111, collimates the light into parallel light, and outputs the parallel light toward the light-guiding plate 321. The parallel light enters and is output from a first surface 322 of the light-guiding plate 321. The first and second diffraction grating members 330 and 340 are provided on a second surface 323 of the light-guiding plate 321, the second surface 323 being parallel to the first surface 322.

In a head-mounted display (HMD) apparatus in which two image display devices are to be worn on the head of an observer, it is important that the distance between the two image display devices matches the distance between the eyes of the observer. The distance between the centers of the eyes varies between individuals, ranging from about 58 mm to about 72 mm, within a difference of about 14 mm. Accordingly, each of the two image display devices is desirably movable by about 7 mm in a first direction, which is a direction defined by a virtual line connecting the centers of the eyes of the observer. A direction perpendicular to the first direction, or a vertical direction with respect to the observer, is defined as a second direction.

Examples of such a binocular head-mounted image display apparatus including a mechanism configured to adjust the distance between right and left image display devices are disclosed in, for example, Japanese Unexamined Patent Application Publications No. 8-136853 and No. 8-136858

SUMMARY

The mechanisms each configured to adjust the distance between right and left image display devices disclosed in Japanese Unexamined Patent Application Publications No. 8-136853 and No. 8-136858 have complex configurations and are therefore not practical in size and weight reduction. Moreover, adjustment of the right and left image display devices in the second direction is performed as adjustment of the heights of the nose pads. It is difficult to simplify the structures of the nose pads. Particularly, it is difficult to reduce the number of components to be positioned in front of the observer's face.

It is desirable that the present invention provide a head-mounted display apparatus including image display devices each having a simple adjustment mechanism so that the head-mounted display apparatus can be appropriately worn by an observer.

According to an embodiment, a head-mounted display apparatus includes the following:

(A) an image display device;

(B) a wearing device with which the image display device is worn on a head of an observer; and (C) an attachment member with which the image display device is attached to the wearing device.

The attachment member is capable of adjusting a position of the image display device relative to the wearing device independently in a first direction and in a second direction, the first direction being defined by a virtual line connecting centers of eyes of the observer, the second direction being perpendicular to the first direction and extending vertically with respect to the observer.

The head-mounted display apparatus according to an embodiment includes the attachment member with which the image display device is attached to the wearing device. The attachment member is capable of freely adjusting the position of the image display device relative to the wearing device independently in the first and second directions, or in the vertical and horizontal directions relative to the eye of the observer. Thus, the overall configuration of the head-mounted display apparatus can be simplified, and the number of components to be positioned in front of the face of the observer can be reduced easily. The apparatus is particularly suitable for application as a head-mounted display apparatus including an image display device whose pupil diameter is 10 mm or smaller.

Additional features and advantages are described herein, and will be apparent from the following Detailed Description and the figures.

BRIEF DESCRIPTION OF THE FIGURES

FIG. 8 is a conceptual diagram of an image display device included in the head-mounted display apparatus of the first exemplary embodiment;

FIG. 9 is a conceptual diagram of an image display device included in a head-mounted display apparatus according to a second exemplary embodiment;

FIGS. 10A and 10B are a conceptual diagram of an image display device included in a head-mounted display apparatus according to a third exemplary embodiment, and a schematic enlarged cross-sectional view showing a part of a reflective volume-hologram diffraction grating;

FIG. 11 is a conceptual diagram of an image display device included in a head-mounted display apparatus according to a fourth exemplary embodiment;

DETAILED DESCRIPTION

Figure 1:
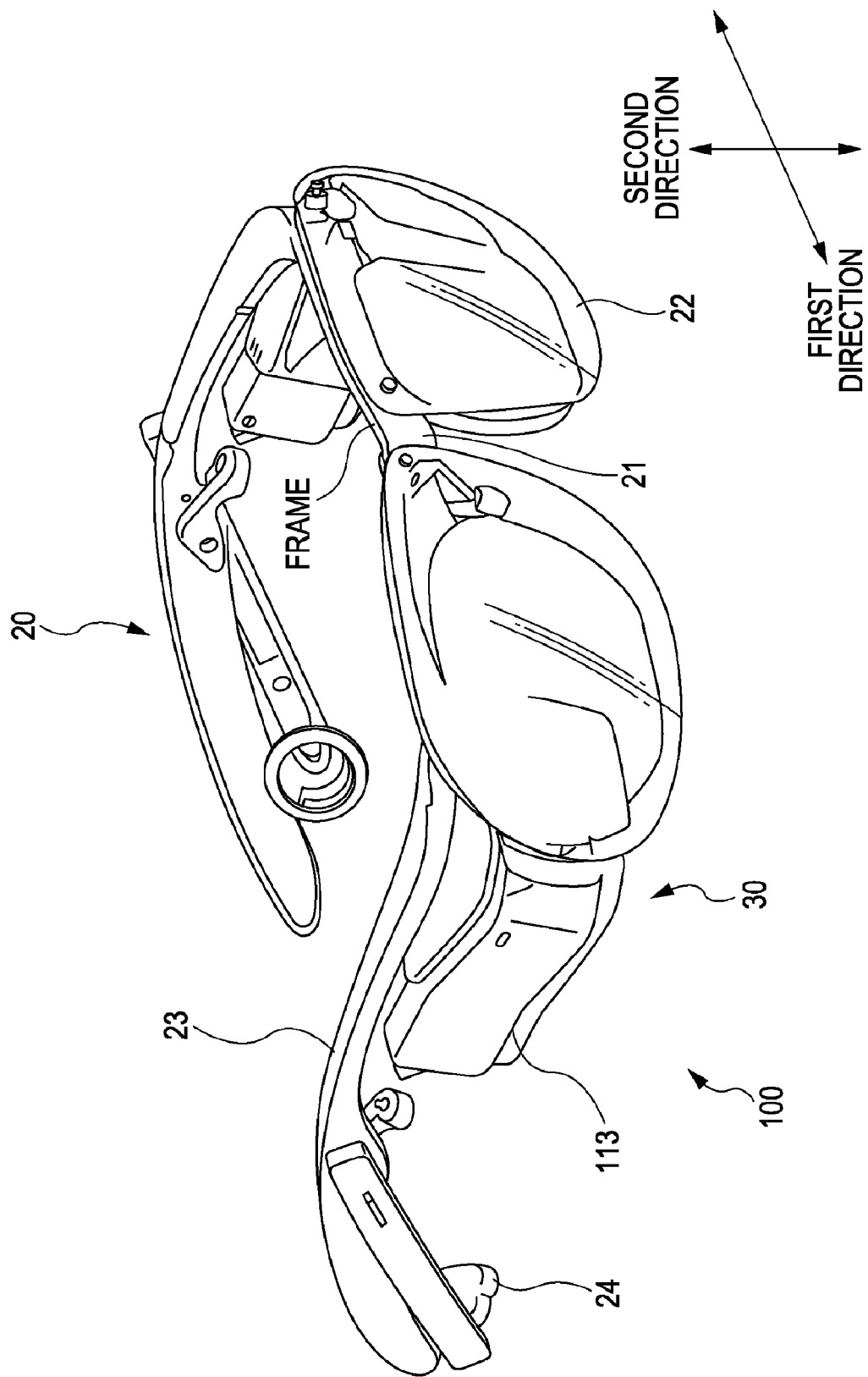
FIG. 1 is a perspective view of a head-mounted display apparatus according to a first exemplary embodiment.

The present application will be described below with reference to the accompanying drawings according to an embodiment. The present application is not limited to the embodiments described below. Descriptions will be given in the following order:

1. Head-mounted display apparatus according to an embodiment.

2. First exemplary embodiment (specific description of a head-mounted display apparatus according to a first exemplary embodiment of the present invention including image generators having a first configuration and optical devices having a first configuration)

3. Second exemplary embodiment (specific description of another head-mounted display apparatus, a variation of the first exemplary embodiment, including image generators having a second configuration and optical devices having the first configuration)

4. Third exemplary embodiment (specific description of another head-mounted display apparatus, another variation of the first exemplary embodiment, including image generators having the first configuration and optical devices having a second configuration)

5. Fourth exemplary embodiment (specific description of another head-mounted display apparatus, another variation of the first exemplary embodiment, including image generators having the second configuration and optical devices having the second configuration)

6. Fifth exemplary embodiment (specific description of another head-mounted display apparatus, another variation of the first exemplary embodiment, including optical devices having a third configuration)

Head-Mounted Display

In the head-mounted display (HMD) apparatus according to an embodiment, it is preferred that the attachment member include the following:

(C-1) first, second, and third balls;

(C-2) a support member having a first linear groove including consecutive depressions, a second linear groove parallel to the first groove and including consecutive depressions, and a third linear groove parallel to the first groove and including consecutive depressions;

(C-3) a retaining member having a fourth linear groove orthogonal to the first groove and including consecutive depressions, a fifth linear groove parallel to the fourth groove and including consecutive depressions, and a sixth linear groove parallel to the fourth groove and including consecutive depressions; and (C-4) an urging member urging the retaining member against the support member.

In a state where the retaining member is urged against the support member by the urging member, the first ball fits into the first and fourth grooves, the second ball fits into the second and fifth grooves, and the third ball fits into the third and sixth grooves, with the first to third balls being positioned at respective apexes of a virtual triangle. The image display device is attached to the support member. The wearing device is attached to the retaining member.

The first to third grooves may extend in the first direction, with the fourth to sixth grooves extending in the second direction. Alternatively, the first to third grooves may extend in the second direction, with the fourth to sixth grooves extending in the first direction. Furthermore, the virtual triangle may be of any shape, for example, an equilateral triangle or an isosceles triangle. The first to sixth grooves may be of any lengths larger than the range within which the image display device is to be moved.

In this case, a guide member may be provided between the support member and the retaining member, the guide member having receiving portions that receive the first to third balls, respectively, so as to position the first to third balls at the apexes of the virtual triangle.

The first to third balls may be, for example, steel balls for use as ball bearings. The support member, the retaining member, the urging member, and the guide member may be made of any of materials including plastics such as polyoxymethylene (POM) resin, acrylonitrile butadiene styrene (ABS) resin, poly(phenylene sulfide) (PPS) resin, and polycarbonate (PC) resin, metals such as stainless steel, titanium, aluminum, and brass, and alloys thereof, by appropriate methods. The image display device and the wearing device may be attached to the support member and the retaining member, respectively, with screws or the like.

In the above preferred embodiment including the above preferred configuration, the first and fourth grooves may be spot-faced so that the first ball is received stably, the second and fifth grooves may be spot-faced so that the second ball is received stably, and the third and sixth grooves may be spot-faced so that the third ball is received stably.

In the head-mounted display apparatus according to the above preferred embodiment including the above preferred configuration, the image display device and the attachment member may be provided for each of the right and left eyes. Alternatively, the image display device and the attachment member may be provided for one of the right and left eyes.

In the head-mounted display apparatus according to the above preferred embodiment including the above preferred configuration, the image display device may include the following:

(A-1) an image generator; and (A-2) an optical device (light-guiding means) receiving light from the image generator, guiding the light, and outputting the light toward a corresponding one of the eyes of the observer.

The optical device may be attached to the image generator, for example.

The optical device (light-guiding means) may include the following:

(A-2-1) a light-guiding plate causing the received light to propagate with total reflection thereinside before outputting the light;

(A-2-2) a first deflector deflecting the light received by the light-guiding plate so that the light is totally reflected inside the light-guiding plate; and (A-2-3) a second deflector deflecting, a plurality of times, the light caused to propagate with total reflection inside the light-guiding plate so that the light is output from the light-guiding plate.

The term "total reflection" means internal total reflection or total reflection inside the light-guiding plate. This also applies to the description hereinafter.

In the optical device according to such an embodiment, the first deflector may reflect the light received by the light-guiding plate, and the second deflector may transmit and reflect, a plurality of times, the light caused to propagate with total reflection inside the light-guiding plate. For convenience of description hereinafter, an optical device having such a configuration will be referred to as an "optical device having the first configuration". In this case, the first deflector may function as a reflective mirror, and the second deflector may function as a transflective mirror.

In such a configuration, the first deflector may be made of metal, inclusive of alloy, for example, and may be a light-reflecting film (a kind of a mirror) that reflects the light received by the light-guiding plate, or a diffraction grating (for example, a hologram diffraction grating film) that diffracts the light received by the light-guiding plate. The second deflector may be any of the following: a multilayer structure in which a number of dielectric films are stacked, a half mirror, a polarization beam splitter, and a hologram diffraction grating film. The first and second deflectors are provided inside (or incorporated in) the light-guiding plate. The first deflector reflects or diffracts the parallel light received by the light-guiding plate so that the parallel light is totally reflected inside the light-guiding plate. The second deflector reflects or diffracts, a plurality of times, the parallel light caused to propagate with total reflection inside the light-guiding plate, and outputs the light, maintaining the form of parallel light, from the light-guiding plate.

In the optical device according to such an embodiment, the first deflector may diffract the light received by the light-guiding plate, and the second deflector may diffract, a plurality of times, the light caused to propagate with total reflection inside the light-guiding plate. For convenience of description hereinafter, an optical device having such a configuration will be referred to as an "optical device having the second configuration". In this case, the first and second deflectors may include diffraction grating elements. The diffraction grating elements may be reflective diffraction grating elements or transmissive diffraction grating elements. As another alternative, one of the diffraction grating elements may be a reflective diffraction grating element and the other may be a transmissive diffraction grating element. Examples of the reflective diffraction grating elements include reflective volume-hologram diffraction gratings. For convenience of description hereinafter, a first deflector constituted by a reflective volume-hologram diffraction grating will be occasionally referred to as a "first diffraction grating member", and a second deflector constituted by a reflective volume-hologram diffraction grating will be occasionally referred to as a "second diffraction grating member".

To accommodate diffraction reflections of a number P (specifically, P=3, corresponding to three colors of red, green, and blue) of kinds of light having a number P of different spectrum bands (or wavelengths), the first and second diffraction grating members may each include a number P of diffraction grating layers, as reflective volume-hologram diffraction gratings, that are stacked one on top of another. Each of the diffraction grating layers has a pattern of interference fringes corresponding to one of the spectrum bands (or wavelengths). Alternatively, to accommodate diffraction reflections of a number P of kinds of light having a number P of different spectrum bands (or wavelengths), the first and second diffraction grating members may each include a single diffraction grating layer having a number P of kinds of interference-fringe patterns. In another alternative case, the first and second diffraction grating members may each include a stack of diffraction grating layers provided in correspondence with, for example, three equally divided angles of view. With any of such configurations, light of the different spectrum bands (or wavelengths) can be diffracted and reflected by the first and second diffraction grating members with an increased diffraction efficiency, a widened diffraction acceptance angle, and an optimized diffraction angle.

Examples of materials composing the first and second diffraction grating members include photopolymer materials. The materials and basic configurations of the first and second diffraction grating members, as reflective volume-hologram diffraction gratings, may be the same as those of related-art reflective volume-hologram diffraction gratings. Herein, a reflective volume-hologram diffraction grating means a hologram diffraction grating that diffracts and reflects light so as to only produce +1st-order diffracted light. The foregoing diffraction grating members each have interference fringes extending thereinside, from one surface thereof to the other. The interference fringes may be formed by a related-art method. Specifically, the interference fringes may be formed as follows. Object light is applied, in a first direction, to one side of a member (for example, a photopolymer material) that is to become the diffraction grating member. At the same time, reference light is applied to the other side of the member in a second direction. The object light and the reference light produce interference fringes. These interference fringes are recorded inside the member. By appropriately setting the first and second directions and the wavelengths of the object light and the reference light, the interference fringes can be formed at a desired pitch on the surface of the diffraction grating member and at a desired slant angle. Herein, the slant angle of interference fringes means an angle formed between the surface of the diffraction grating member (or the diffraction grating layer) and each of the interference fringes. In a case where the first and second diffraction grating members each have a multilayer structure including a number P of diffraction grating layers as reflective volume-hologram diffraction gratings, a stack of the diffraction grating layers may be obtained by making the number P of diffraction grating layers separately and subsequently stacking (bonding) the diffraction grating layers with ultraviolet-curable adhesive or the like provided therebetween. Alternatively, the number P of diffraction grating layers may be obtained by preparing a diffraction grating layer made of a cohesive photopolymer material, and then sequentially providing other layers of cohesive photopolymer material thereon.

In the head-mounted display apparatus according to an embodiment, the optical device may alternatively include a transflective mirror receiving the light from the image generator and outputting the light toward the eye of the observer. For convenience of description hereinafter, an optical device having such a configuration will be referred to as an "optical device having the third configuration". Light emitted from the image generator may propagate either in the air or inside a transparent member such as a glass plate or a plastic plate (specifically, a member made of the same material as of the light-guiding plate described below) before entering the transflective mirror. Depending on circumstances, the transflective mirror may be attached to the image generator with either the transparent member or another different member interposed therebetween.

In the head-mounted display apparatus according to an above preferred embodiment including the above preferred configuration, the image generator may include the following:

(A-1-1) an image-forming device having a plurality of pixels arranged in a two-dimensional matrix; and (A-1-2) a collimating optical system collimating light from the pixels of the image-forming device into parallel light and outputting the parallel light.

For convenience of description hereinafter, an image generator having such a configuration will be referred to as an "image generator having the first configuration".

The image-forming device included in the image generator having the first configuration may be any of the following: an image-forming device including a reflective spatial-light modulator and a light source, an image-forming device including a transmissive spatial-light modulator and a light source, and an image-forming device including light-emitting elements such as organic electroluminescent (EL) elements, inorganic EL elements, light-emitting diodes (LEDs), or the like. In particular, the image-forming device including a reflective spatial-light modulator and a light source is preferable. Examples of the spatial-light modulator include a light valve such as a transmissive or reflective liquid crystal display device such as a liquid-crystal-on-silicon (LCOS) device, and a digital micromirror device (DMD). Examples of the light source include a light-emitting element. The reflective spatial-light modulator may include a liquid crystal display device and a polarization beam splitter that reflects part of light from the light source and guides the part of light to the liquid crystal display device while allowing part of light reflected by the liquid crystal display device to pass therethrough and guiding the part of light to the collimating optical system. Examples of the light-emitting element constituting the light source include a red-light-emitting element, a green-light-emitting element, a blue-light-emitting element, and a white-light-emitting element. Such light-emitting elements may be, for example, semiconductor light-emitting elements such as semiconductor laser elements or LEDs. The number of pixels may be determined in accordance with desired specifications of the head-mounted display apparatus. For example, the number of pixels may be 320×240, 432×240, 640×480, 1024×768, or 1920×1080.

In the head-mounted display apparatus according to the above preferred embodiment including the above preferred configuration, the image generator may include the following:

(A-1-1) a light source;

(A-1-2) a collimating optical system collimating light from the light source into parallel light;

(A-1-3) a scanner scanningly moving the parallel light from the collimating optical system; and (A-1-4) a relay optical system relaying and outputting the parallel light scanningly moved by the scanner.

For convenience of description hereinafter, an image generator having such a configuration will be referred to as an "image generator having the second configuration".

Examples of the light source included in the image generator having the second configuration include a light-emitting element, such as a red-light-emitting element, a green-light-emitting element, a blue-light-emitting element, and a white-light-emitting element. Such light-emitting elements may be, for example, semiconductor light-emitting elements such as semiconductor laser elements or LEDs. The number of pixels (virtual pixels) included in the image generator having the second configuration may also be determined in accordance with desired specifications of the head-mounted display apparatus. For example, the number of pixels (virtual pixels) may be 320×240, 432×240, 640×480, 1024×768, or 1920× 1080. In a case where the light source includes red-, green-, and blue-light-emitting elements, it is preferred that the colors of the light be combined by using, for example, a cross prism. Examples of the scanner include a microelectromechanical system (MEMS) including a micromirror rotatable in two-dimensional directions, and a galvanometer mirror. The MEMS and the galvanometer mirror scanningly move the light from the light source in the horizontal and vertical directions. The relay optical system may be configured as in the related art.

An example of the image-forming device or the light source constituted by a light-emitting element and a light valve is a combination of a backlight that emits white light on the whole and a liquid crystal display device having red-, green-, and blue-light-emitting elements. Other exemplary configurations will now be described below.

Image-Forming Device A

An image-forming device A includes the following:

(α) a first image-forming unit including a first light-emitting panel on which first light-emitting elements that emit blue light are arranged in a two-dimensional matrix;

(β) a second image-forming unit including a second light-emitting panel on which second light-emitting elements that emit green light are arranged in a two-dimensional matrix;

(γ) a third image-forming unit including a third light-emitting panel on which third light-emitting elements that emit red light are arranged in a two-dimensional matrix; and (δ) means (a dichroic prism, for example; the same applies to other image-forming devices described below) for combining the light emitted from the first, second, and third image-forming units into a single ray of light.

The image-forming device A controls the first to third light-emitting elements to individually switch between emitting and non-emitting states.

Image-Forming Device B

An image-forming device B includes the following:

(α) a first image-forming unit including a first light-emitting element that emits blue light and a first light-passage control device (a kind of a light valve such as a liquid crystal display device, a DMD, or an LCOS; the same applies to the description hereinafter) that controls the light emitted from the first light-emitting element to pass therethrough or to be blocked thereby;

(β) a second image-forming unit including a second light-emitting element that emits green light and a second light-passage control device (a light valve) that controls the light emitted from the second light-emitting element to pass therethrough or to be blocked thereby;

(γ) a third image-forming unit including a third light-emitting element that emits red light and a third light-passage control device (a light valve) that controls the light emitted from the third light-emitting element to pass therethrough or to be blocked thereby; and (δ) means for combining the light that has passed through the first to third light-passage control devices into a single ray of light.

The image forming device B displays an image by controlling with the light-passage control devices the passage/blockage of the light emitted from the respective light-emitting elements. Examples of means (light-guiding members) for guiding the light emitted from the first to third light-emitting elements to the respective light-passage control devices include microlens arrays, mirrors, reflective plates, and condenser lenses.

Image-Forming Device C

An image-forming device C includes the following:

(α) a first image-forming unit including a first light-emitting panel on which first light-emitting elements that emit blue light are arranged in a two-dimensional matrix, and a blue-light-passage control device (a light valve) that controls the light emitted from the first light-emitting panel to pass therethrough or to be blocked thereby;

(β) a second image-forming unit including a second light-emitting panel on which second light-emitting elements that emit green light are arranged in a two-dimensional matrix, and a green-light-passage control device (a light valve) that controls the light emitted from the second light-emitting panel to pass therethrough or to be blocked thereby;

(γ) a third image-forming unit including a third light-emitting panel on which third light-emitting elements that emit red light are arranged in a two-dimensional matrix, and a red-light-passage control device (a light valve) that controls the light emitted from the third light-emitting panel to pass therethrough or to be blocked thereby; and (δ) means for combining the light that has passed through the blue-, green-, and red-light-passage control devices into a single ray of light.

The image-forming device C displays an image by controlling with the light-passage control devices (light valves) the passage/blockage of the light emitted from the respective light-emitting panels.

Image-Forming Device D

An image forming device D is a field-sequential color image-forming device and includes the following:

(α) a first image-forming unit having a first light-emitting element that emits blue light;

(β) a second image-forming unit having a second light-emitting element that emits green light;

(γ) a third image-forming unit having a third light-emitting element that emits red light;

(δ) means for combining the light emitted from the first to third image-forming units into a single ray of light; and (∈) a light-passage control device (a light valve) that controls the light emitted from the means for combining the light to pass therethrough or to be blocked thereby.

The image-forming device D displays an image by controlling with the light-passage control device the passage/blockage of the light emitted from the light-emitting elements.

Image-Forming Device E

An image forming device E is also a field-sequential color image-forming device and includes the following:

(α) a first image-forming unit including a first light-emitting panel on which first light-emitting elements that emit blue light are arranged in a two-dimensional matrix;

(β) a second image-forming unit including a second light-emitting panel on which second light-emitting elements that emit green light are arranged in a two-dimensional matrix;

(γ) a third image-forming unit including a third light-emitting panel on which third light-emitting elements that emit red light are arranged in a two-dimensional matrix;

(δ) means for combining the light emitted from the first to third image forming units into a single ray of light; and (∈) a light-passage control device (a light valve) that controls the light emitted from the means for combining the light to pass therethrough or to be blocked thereby.

The image forming device E displays an image by controlling with the light-passage control device the passage/blockage of the light emitted from the first to third light-emitting panels.

Image-Forming Device F

An image forming device F is a passive-matrix or active-matrix color image-forming device, and displays an image by controlling first, second and third light-emitting elements to individually switch between emitting and non-emitting states.

Image-Forming Device G

An image forming device G is a field-sequential color image-forming device and includes a light-passage control device (a light valve) that controls light emitted from light-emitting-element units arranged in a two-dimensional matrix to pass therethrough or to be blocked thereby. The image forming device G displays an image by controlling, in a time-shared manner, first, second, and third light-emitting elements included in the light-emitting-element units to individually switch between emitting and non-emitting states, and by controlling with the light-passage control device the passage/blockage of the light emitted from the first to third light-emitting elements.

In each of the image generators having the first and second configurations, light is collimated by the collimating optical system into a plurality of parallel rays, and the parallel rays are caused to enter the light-guiding plate. The reason for producing parallel rays is because optical wavefront information obtained when the light enters the light-guiding plate is to be maintained in the same form even after the light strikes the first and second deflectors and is output from the light-guiding plate. To produce a plurality of parallel rays, the image-forming device may be positioned at a distance from the collimating optical system corresponding to the focal length of the collimating optical system, for example. The collimating optical system has a function of converting positional information on pixels into angular information in the optical system of the optical device. The collimating optical system may be any of or any combination of a convex lens, a concave lens, a free-form-surface prism, and a hologram lens as long as the collimating optical system can have a positive optical power on the whole.

The light-guiding plate has two parallel surfaces (a first surface and a second surface) extending in the axial direction (Y direction) thereof. The surface of the light-guiding plate from which light enters is defined as the plane of incidence, and the surface of the light-guiding plate from which light emerges is defined as the plane of emergence. The first surface may serve as both the plane of incidence and the plane of emergence. Alternatively, the first surface and the second surface may serve as the plane of incidence and the plane of emergence, respectively. Examples of the material composing the light-guiding plate include glasses such as quartz glass and optical glasses including BK7, and plastic materials such as poly(methylmethacrylate) (PMMA), polycarbonate resin, acrylic resin, noncrystalline polypropylenic resin, stylenic resin including acrylonitrile-styrene (AS) resin. The light-guiding plate is not limited to a flat plate, and may be a curved plate.

In the head-mounted display apparatus according to the above preferred embodiment including the above preferred configuration, the wearing device may form a frame of a pair of glasses. In addition, the frame may include a front member to be positioned in front of the observer, and two temples turnably attached to respective ends of the front member with hinges, the attachment member being attached to each of the ends of the front member. The front member is provided with a nose pad at the center thereof. That is, the frame of the above embodiment has substantially the same configuration as a pair of normal glasses, except that the frame includes no rims. The frame may be made of any of or any combination of materials such as metal, alloy, and plastic, which are used for making normal glasses.

First Exemplary Embodiment

Figure 2:
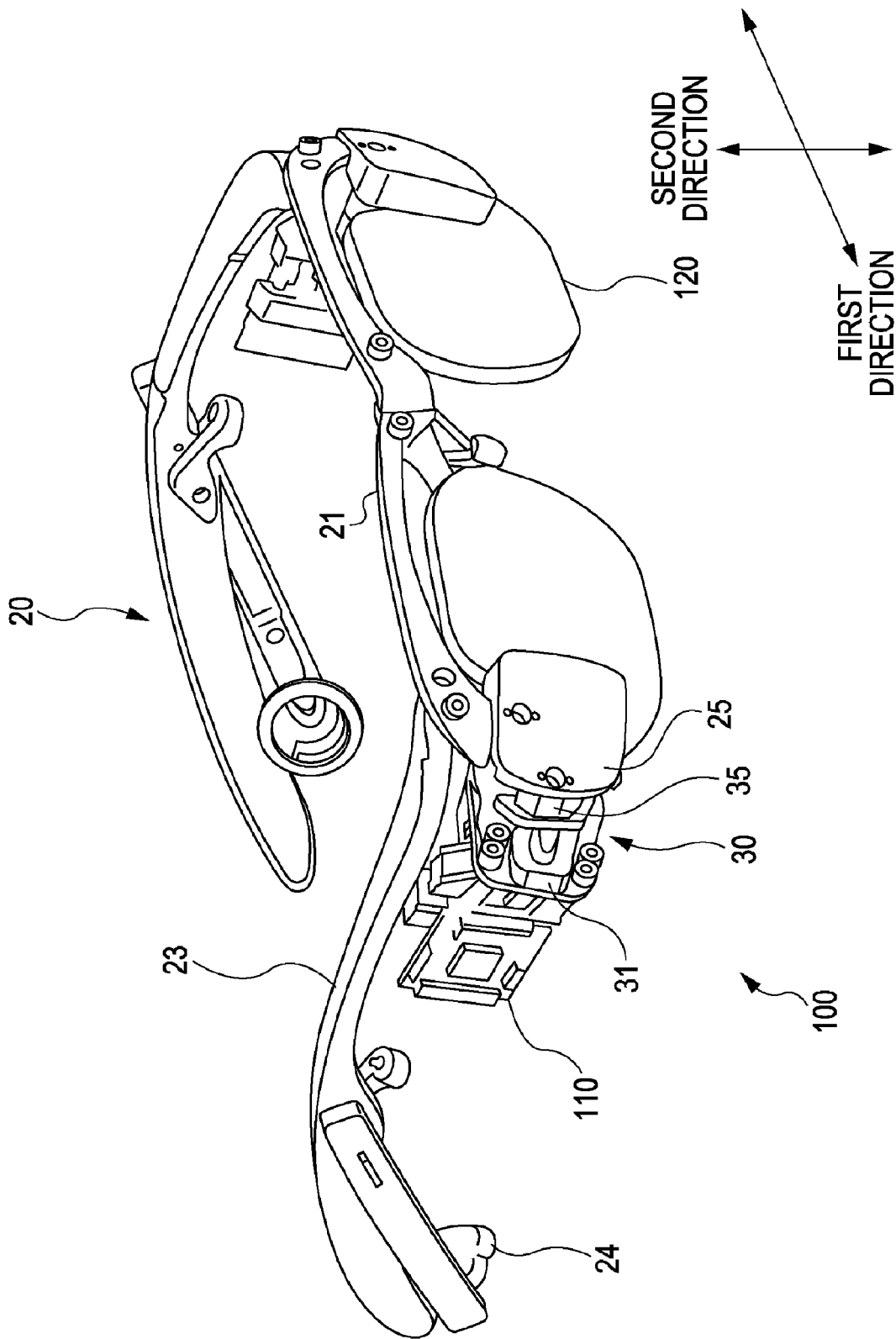
FIG. 2 is a perspective view of the head-mounted display apparatus of the first exemplary embodiment, with some components removed.
Figure 3:
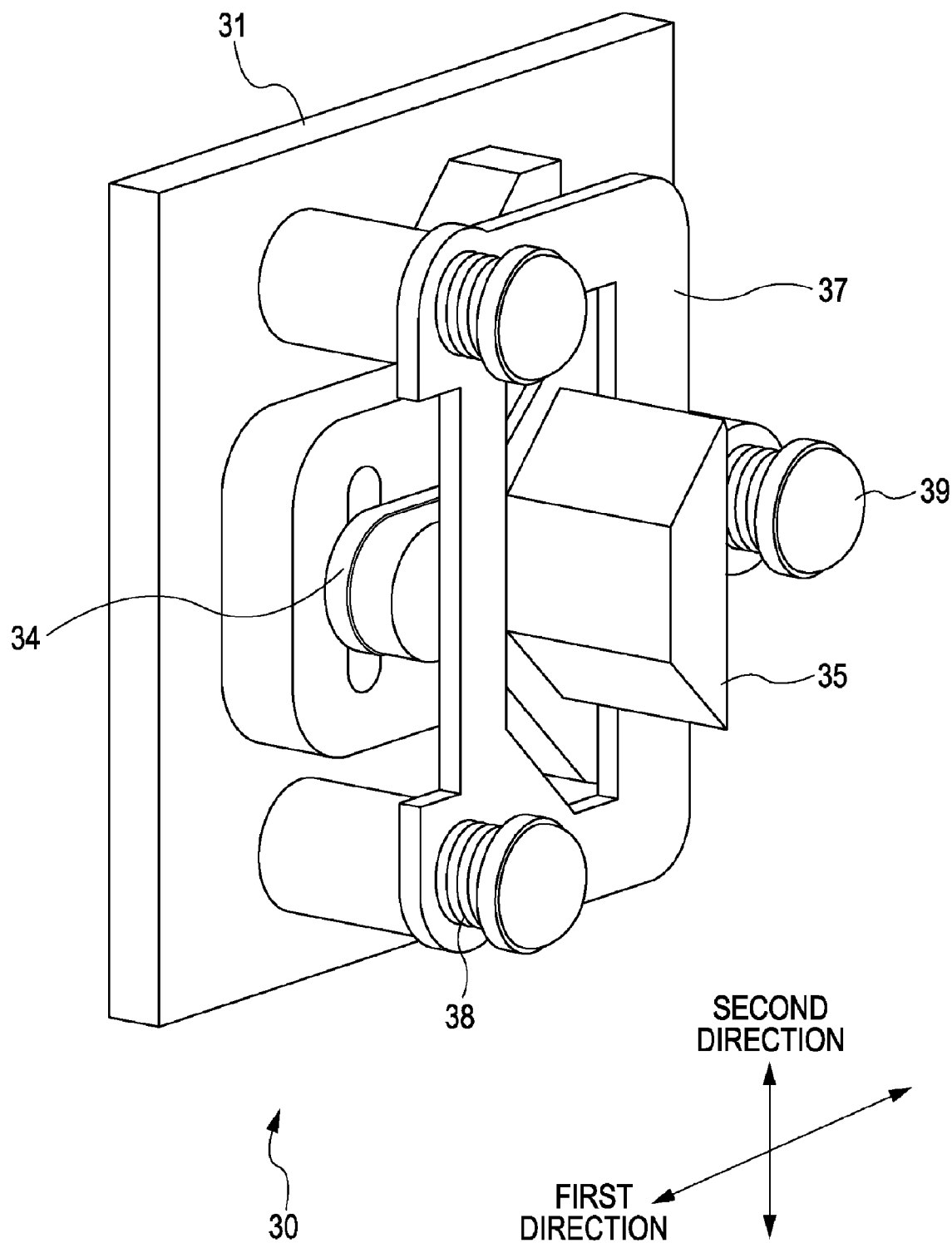
FIG. 3 is a perspective view of an attachment member, in an assembled state, included in the head-mounted display apparatus of the first exemplary embodiment.
Figure 4:
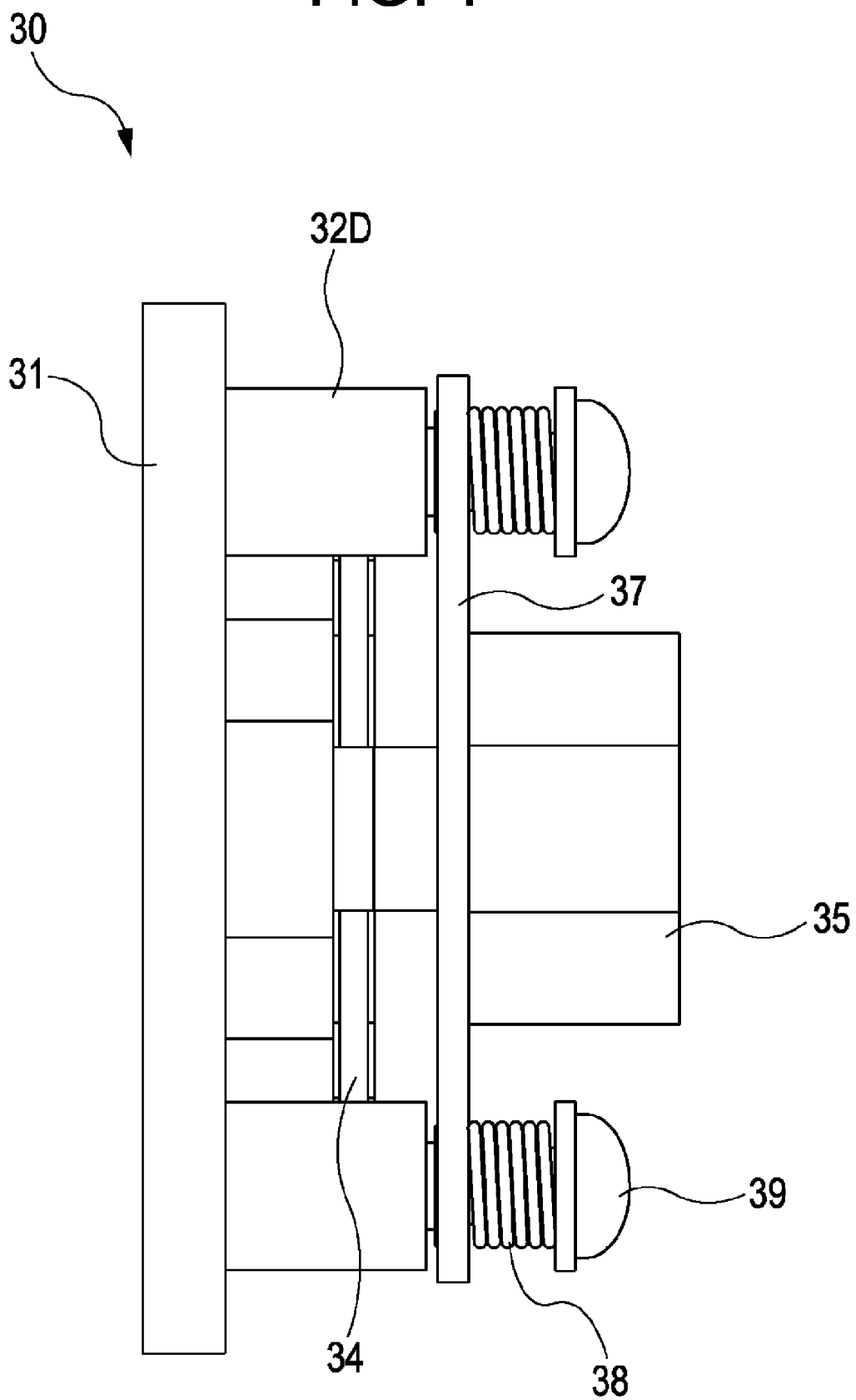
FIG. 4 is a side view of the attachment member, in the assembled state, included in the head-mounted display apparatus of the first exemplary embodiment.
Figure 5:
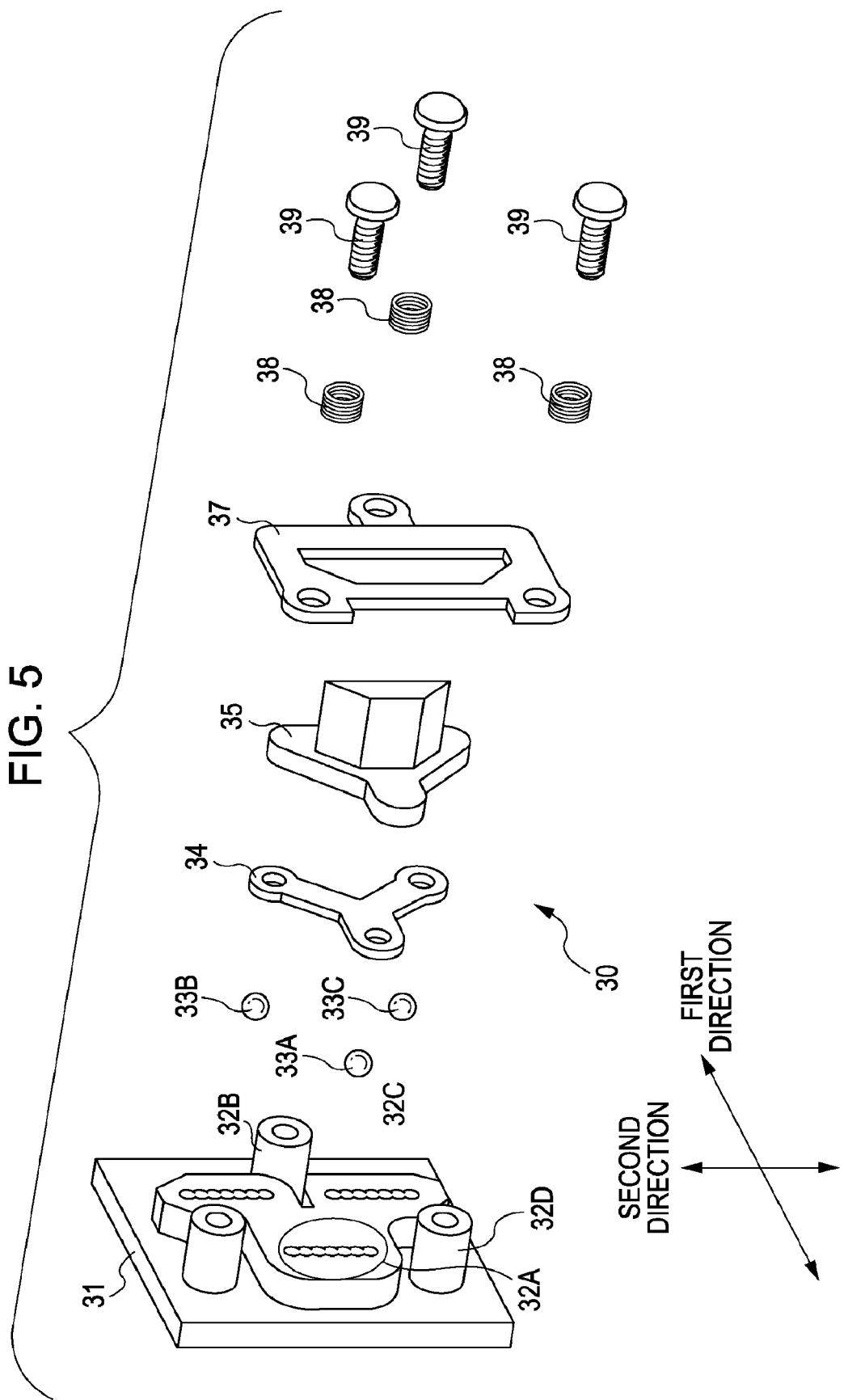
FIG. 5 is an exploded perspective view of the attachment member included in the head-mounted display apparatus of the first exemplary embodiment.
Figure 6:
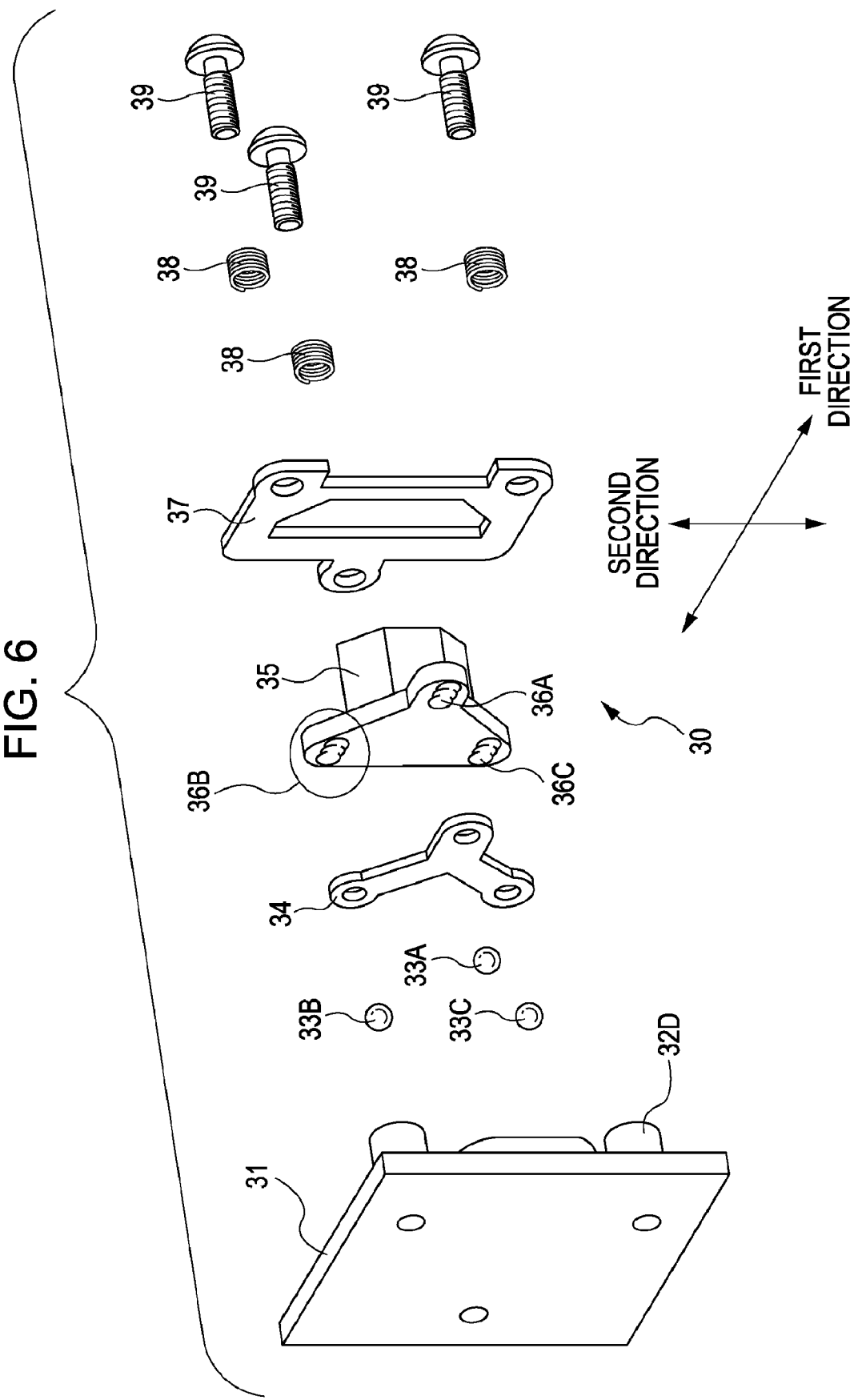
FIG. 6 is another exploded perspective view of the attachment member included in the head-mounted display apparatus of the first exemplary embodiment, seen in a different direction from FIG. 5.

A first exemplary embodiment relates to the head-mounted display apparatus according to an embodiment. FIGS. 1 and 2 are perspective views of a head-mounted display apparatus according to the first exemplary embodiment. FIG. 3 is a perspective view of an attachment member in an assembled state. FIG. 4 is a side view of the attachment member in the assembled state. FIG. 5 is an exploded perspective view of the attachment member. FIG. 6 is another exploded perspective view of the attachment member seen in a different direction from FIG. 5.

The head-mounted display of the first exemplary embodiment includes the following:

(A) image display devices 100;

(B) a wearing device 20 with which the image display devices 100 are worn on the head of an observer; and (C) attachment members 30 with which the image display devices 100 are attached to the wearing device 20.

The attachment members 30 are each capable of adjusting the position of a corresponding one of the image display devices 100 relative to the wearing device 20 independently in a first direction and in a second direction. The first direction is defined by a virtual line connecting the centers of the eyes of the observer. The second direction is perpendicular to the first direction and extends in the vertical direction with respect to the observer. The head-mounted display apparatus of the first exemplary embodiment includes two image display devices 100 and two attachment members 30 for the right and left eyes. FIG. 1 shows a state where the image display devices 100 are covered with covers 113. FIG. 2 shows a state where the image display devices 100 are exposed without the covers 113 and lens shields 22 that protect light-guiding plates 121, which will be described separately below.

Specifically, the attachment members 30 each include the following:

(C-1) first, second, and third balls 33A, 33B, and 33C;

(C-2) a support member 31;

(C-3) a retaining member 35; and (C-4) urging members 37, 38, and 39 urging the retaining member 35 against the support member 31.

The support member 31 has in a surface thereof facing the retaining member 35 a first linear groove 32A including consecutive depressions, a second linear groove 32B parallel to the first groove 32A and including consecutive depressions, and a third linear groove 32C parallel to the first groove 32A and including consecutive depressions. The retaining member 35 has in a surface thereof facing the support member 31 a fourth linear groove 36A orthogonal to the first groove 32A and including consecutive depressions, a fifth linear groove 36B parallel to the fourth groove 36A and including consecutive depressions, and a sixth linear groove 36C parallel to the fourth groove 36A and including consecutive depressions. In the first exemplary embodiment, the first to third grooves 32A to 32C extend in the second direction, and the fourth to sixth grooves 36A to 36C extend in the first direction. Alternatively, the first to third grooves 32A to 32C may extend in the first direction, with the fourth to sixth grooves 36A to 36C extending in the second direction. The urging members include an urging plate 37, urging springs 38, and urging screws 39. The support member 31 has on the surface thereof facing the retaining member 35 three bosses 32D. The urging screws 39 are screwed into the bosses 32D, respectively.

In a state where the retaining member 35 is urged against the support member 31 by the urging members, the first ball 33A fits into the first and fourth grooves 32A and 36A, the second ball 33B fits into the second and fifth grooves 32B and 36B, and the third ball 33C fits into the third and sixth grooves 32C and 36C. In this state, the first to third balls 33A to 33C are positioned at the respective apexes of a virtual triangle (specifically in the first exemplary embodiment, an isosceles triangle).

The image display devices 100 are attached to the respective support members 31 (specifically, to respective securing members 25 provided on the wearing device 20) with screws (not shown), and the wearing device 20 is attached to the retaining members 35 with screws (not shown).

Figure 7A:
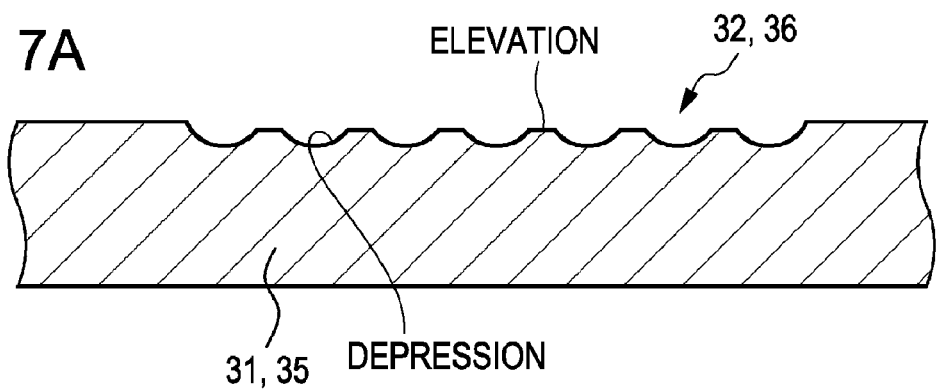
FIG. 7A is a schematic cross-sectional view of a part of the attachment member, including a support member and a retaining member having grooves.
Figure 7B:
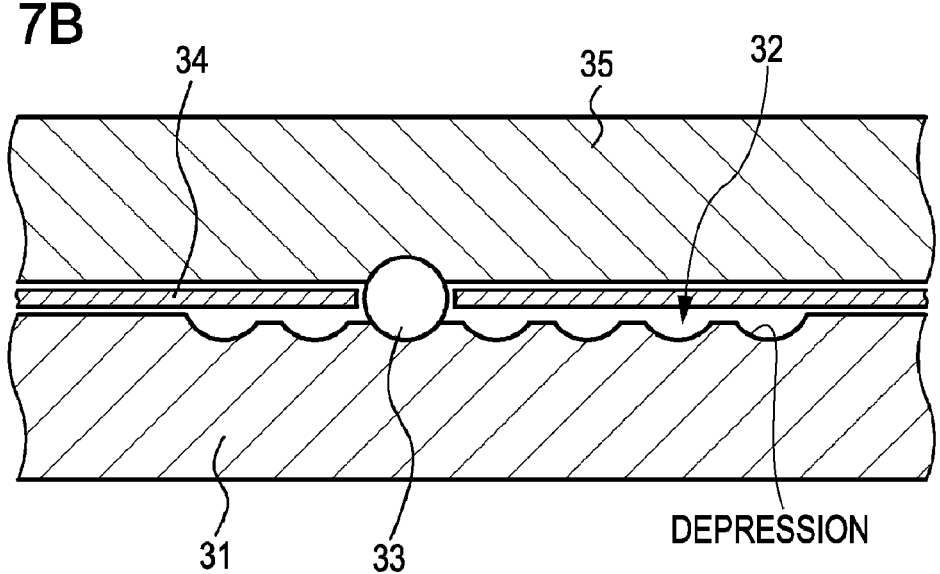
FIGS. 7B and 7C are schematic cross-sectional views of relevant parts including the support member, the grooves, depressions, balls, guide member, and the retaining member showing the arrangement thereof.

To position the first to third balls 33A to 33C at the apexes of the virtual triangle, a guide member 34 is provided between the support member 31 and the retaining member 35. The guide member 34 has receiving portions (a kind of through holes) that receive the first to third balls 33A to 33C, respectively. The guide member 34 restricts the movements of the balls 33A to 33C. FIG. 7B is a schematic cross-sectional view of relevant parts including the support member 31, the grooves 32, the depressions, the balls 33, the guide member 34, and the retaining member 35, showing the arrangement thereof.

The first and fourth grooves 32A and 36A are spot-faced so that the first ball 33A is received stably. The second and fifth grooves 32B and 36B are spot-faced so that the second ball 33B is received stably. The third and sixth grooves 32C and 36C are spot-faced so that the third ball 33C is received stably. Specifically, the grooves 32 each include consecutive depressions with elevations interposed therebetween, the depressions each receiving about ⅓ of a corresponding one of the first to third balls 33A to 33C. FIG. 7A is a schematic cross-sectional view of relevant parts including the support member 31 and the retaining member 35 having the grooves 32 and 36.

In the state where the retaining member 35 is urged against the support member 31 by the urging members, the first ball 33A fits into the first and fourth grooves 32A and 36A, with about ⅓ of the first ball 33A on one side being inside one of the depressions of the first groove 32A and about ⅓ of the first ball 33A on the other side being inside one of the depressions of the fourth groove 36A; the second ball 33B fits into the second and fifth grooves 32B and 36B, with about ⅓ of the second ball 33B on one side being inside one of the depressions of the second groove 32B and about ⅓ of the second ball 33B on the other side being inside one of the depressions of the fifth groove 36B; and the third ball 33C fits into the third and sixth grooves 32C and 36C, with about ⅓ of the third ball 33C on one side being inside one of the depressions of the third groove 32C and about ⅓ of the third ball 33C on the other side being inside one of the depressions of the sixth groove 36C.

In the state where the retaining member 35 is not urged against the support member 31, the first ball 33A is movable from one of the depressions of the first groove 32A to another adjacent thereto over the elevation therebetween, and from one of the depressions of the fourth groove 36A to another adjacent thereto over the elevation therebetween; the second ball 33B is movable from one of the depressions of the second groove 32B to another adjacent thereto over the elevation therebetween, and from one of the depressions of the fifth groove 36B to another adjacent thereto over the elevation therebetween; and the third ball 33C is movable from one of the depressions of the third groove 32C to another adjacent thereto over the elevation therebetween, and from one of the depressions of the sixth groove 36C to another adjacent thereto over the elevation therebetween.

The first to third balls 33A to 33C are steel balls for use as ball bearings. The support member 31, the retaining member 35, the urging plate 37, and the guide member 34 are made of aluminum, POM, aluminum, and ABS, respectively.

The wearing device 20 forms a frame of a pair of glasses. The wearing device (frame) 20 includes a front member 21 to be positioned in front of the observer and two temples 23 turnably attached to respective ends of the front member 21 with hinges (not shown). The attachment members 30 are attached to the respective ends of the front member 21 (specifically, to the respective securing members 25 provided on the wearing device 20). The front member 21 is provided with a nose pad (not shown) at the center thereof. That is, the wearing device (frame) 20 has substantially the same configuration as a pair of normal glasses, except that the wearing device (frame) 20 includes no rims. The frame is made of any of or any combination of materials such as metal, alloy, and plastic, which are also used for making normal glasses. The wearing device 20 is also provided with headphones 24.

Figure 7C:
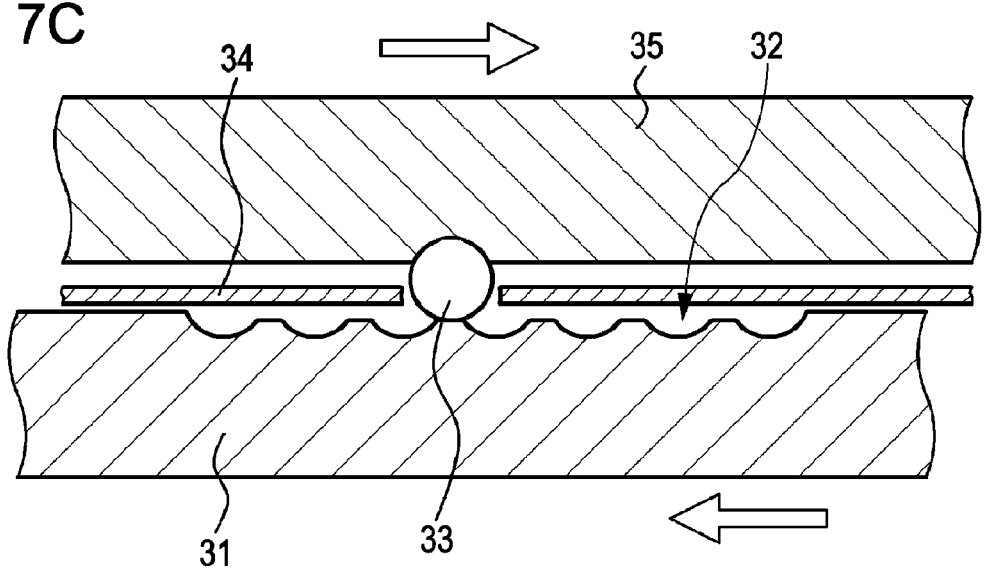

When the wearing device 20 is worn on the head of an observer, the distance (in the first direction) between the right and left image display devices 100 and the vertical positions (in the second direction) of the right and left image display devices 100 relative to the respective eyes of the observer are adjusted. This adjustment is done by loosening the urging screws 39, so that the retaining members 35 are released from the urging force against the support members 31. In this state, the support member 31 is moved in the first direction relative to the retaining member 35. Then, referring to FIG. 7C, the first to third balls 33A to 33C each move from one depression in the corresponding one of the fourth to sixth grooves 36A to 36C to another adjacent thereto over the elevation therebetween. Thus, the distance (in the first direction) between the right and left image display devices 100 can be adjusted. Furthermore, the support member 31 is moved in the second direction relative to the retaining member 35. Then, the first to third balls 33A to 33C each move from one depression in the corresponding one of the first to third grooves 32A to 32C to another adjacent thereto over the elevation therebetween. Thus, the vertical positions (in the second direction) of the right and left image display devices 100 relative to the respective eyes of the observer can be adjusted. Subsequently, the urging screws 39 are fastened, so that the retaining member 35 is urged against the support member 31. Thus, play between the retaining member 35 and the support member 31 is eliminated.

As described above, the head-mounted display apparatus of the first exemplary embodiment includes the attachment members 30 with which the image display devices 100 are attached to the wearing device 20. The attachment members 30 are each capable of adjusting the position of the corresponding image display device 100 relative to the wearing device 20 independently in the first and second directions. Thus, the overall configuration of the head-mounted display apparatus can be simplified, making it easier to realize a design with a reduced number of components to be positioned in front of the observer's face. Furthermore, the overall size and weight of the head-mounted display apparatus can be reduced.

FIG. 8 is a conceptual diagram of one of the image display devices 100 included in the head-mounted display apparatus of the first exemplary embodiment. The image display device 100 included in the head-mounted display apparatus of the first exemplary embodiment includes an image generator having the first configuration and an optical device having the first configuration.

The image display device 100 includes the following:

(A-1) an image generator 110 having the first configuration; and (A-2) an optical device (light-guiding means) 120 receiving light from the image generator 110, guiding the light, and outputting the light toward an eye 41 of an observer.

The optical device 120 is attached to the image generator 110.

In the first exemplary embodiment shown in FIG. 8, the optical device 120 has the first configuration including the following:

(A-2-1) a light-guiding plate 121 causing the light received from the image generator 110 to propagate with total reflection thereinside before outputting the light toward the eye 41 of the observer;

(A-2-2) a first deflector 130 deflecting the light received by the light-guiding plate 121 so that the light is totally reflected inside the light-guiding plate 121; and (A-2-3) a second deflector 140 deflecting, a plurality of times, the light caused to propagate with total reflection inside the light-guiding plate 121 so that the light is output from the light-guiding plate 121.

The first and second deflectors 130 and 140 are provided inside the light-guiding plate 121. The first deflector 130 reflects the light received by the light-guiding plate 121. The second deflector 140 transmits and reflects, a plurality of times, the light caused to propagate with total reflection inside the light-guiding plate 121. That is, the first deflector 130 functions as a reflective mirror, whereas the second deflector 140 functions as a transflective mirror. Specifically, the first deflector 130 provided inside the light-guiding plate 121 is made of aluminum and includes a light-reflecting film (a kind of mirror) reflecting the light received by the light-guiding plate 121. Whereas, the second deflector 140 provided inside the light-guiding plate 121 is a multilayer structure in which a number of dielectric films are stacked. The dielectric films include, for example, TiO2 films having high dielectric constants and SiO2 films having low dielectric constants. An exemplary multilayer structure in which a number of dielectric films are stacked is disclosed in Japanese Unexamined Patent Application Publication (Translation of PCT Application) No. 2005-521099. Although FIG. 8 shows a structure including six dielectric films, the multilayer structure is not limited thereto. Thin pieces made of the same material as of the light-guiding plate 121 are provided between the dielectric films. At the first deflector 130, the parallel light received by the light-guiding plate 121 is reflected (or diffracted) in such a manner as to be totally reflected inside the light-guiding plate 121. At the second deflector 140, the parallel light caused to propagate with total reflection inside the light-guiding plate 121 is reflected (or diffracted) a plurality of times and is subsequently output, maintaining the form of parallel light, from the light-guiding plate 121.

The first deflector 130 can be obtained in the following manner. A portion 124 of the light-guiding plate 121 defined by a plane in which the first deflector 130 is to be provided is cut off, whereby a slanting surface on which the first deflector 130 is to be provided is formed. Then, after a light-reflecting film is formed on the slanting surface by vacuum deposition, the portion 124 is bonded back onto the resulting first deflector 130. The second deflector 140 can be obtained in the following manner. First, a multilayer structure in which thin pieces made of the same material as of the light-guiding plate 121 (glass, for example) and dielectric films (obtained by vacuum deposition, for example) are alternately stacked is manufactured. A portion 125 of the light-guiding plate 121 defined by a plane in which the second deflector 140 is to be provided is cut off, whereby a slanting surface is formed. Then, after the multilayer structure is bonded onto the slanting surface, the outer shape of the resulting structure is adjusted by polishing or the like. Thus, the optical device 120 can be obtained in which the first deflector 130 and the second deflector 140 are incorporated in the light-guiding plate 121.

The light-guiding plate 121, made of optical glass or plastic material, has two parallel surfaces (a first surface 122 and a second surface 123) extending parallel to the axis of the light-guiding plate 121. The first surface 122 and the second surface 123 are positioned opposite each other. The parallel light enters from a portion, forming a plane of incidence, of the first surface 122, propagates with total reflection inside the light-guiding plate 121, and emerges from another portion, forming a plane of emergence, of the first surface 122.

Referring to FIG. 8, the image generator 110 having the first configuration includes the following:

(A-1-1) an image-forming device 111 having a plurality of pixels arranged in a two-dimensional matrix; and (A-1-2) a collimating optical system 112 collimating the light from the pixels of the image-forming device 111 into parallel light and outputting the parallel light.

The image generator 110 is covered with the cover 113.

The image-forming device 111 includes a reflective spatial-light modulator 150 and a light source 153. The light source 153 includes a light-emitting diode that emits white light. Specifically, the reflective spatial-light modulator 150 includes a liquid crystal display (LCD) device 151 that is an LCOS serving as a light valve, and a polarization beam splitter 152 that reflects part of light from the light source 153 and guides the part of light to the LCD device 151 while allowing part of the light reflected by the LCD device 151 to pass therethrough and guiding the part of the light to the collimating optical system 112. The LCD device 151 has a plurality (320×240, for example) of pixels arranged in a two-dimensional matrix. The polarization beam splitter 152 has the same configuration as in the related art. The light emitted as unpolarized light from the light source 153 strikes the polarization beam splitter 152. The polarization beam splitter 152 allows p-polarized components to pass therethrough so as to be output to the outside of its system, whereas the polarization beam splitter 152 reflects s-polarized components. The reflected s-polarized components enter the LCD device 151, are reflected thereinside, and are output to the outside. Among the light that is output from the LCD device 151, light that is output from pixels displaying "white" contain a relatively large number of p-polarized components, and light that is output from pixels displaying "black" contain a relatively large number of s-polarized components. That is, among the light that strikes the polarization beam splitter 152 after being output from the LCD device 151, p-polarized components pass through the polarization beam splitter 152 and are guided toward the collimating optical system 112, whereas s-polarized components are reflected by the polarization beam splitter 152 and are fed back to the light source 153. The LCD device 151 includes the plurality of pixels (320×240 pixels, for example, with the number of liquid crystal cells being three times larger than the number of pixels) that are arranged in, for example, a two-dimensional matrix. The collimating optical system 112 is a convex lens, for example. The image-forming device 111 (specifically, the LCD device 151) is positioned at a distance from the collimating optical system 112 corresponding to the focal length of the collimating optical system 112 so that parallel light is produced. Each of the pixels includes a red-light-emitting subpixel that emits red light, a green-light-emitting subpixel that emits green light, and a blue-light-emitting subpixel that emits blue light.

A second exemplary embodiment is a variation of the first exemplary embodiment. FIG. 9 is a conceptual diagram of one of image display devices 200 included in a head-mounted display apparatus of the second exemplary embodiment. The image display device 200 of the second exemplary embodiment includes an image generator 210 having the second configuration. Specifically, the image generator 210 includes the following:

(A-1-1) a light source 251;

(A-1-2) a collimating optical system 252 collimating light from the light source 251 into parallel light;

(A-1-3) a scanner 253 scanningly moving the parallel light from the collimating optical system 252; and (A-1-4) a relay optical system 254 relaying and outputting the parallel light scanningly moved by the scanner 253.

The image generator 210 is covered with a cover 213.

The light source 251 includes a red-light-emitting element 251R that emits red light, a green-light-emitting element 251G that emits green light, and a blue-light-emitting element 251B that emits blue light. The light-emitting elements 251R, 251G, and 251B are semiconductor laser elements. Rays of light of the three primary colors emitted from the light source 251 are transmitted through a cross prism 255, thereby being combined into a single ray of light. The light enters and is collimated by the collimating optical system 252, which has a positive optical power on the whole, and is output therefrom as parallel light. The parallel light is reflected by a total-reflection mirror 256, and is scanningly moved by the scanner 253 in the horizontal and vertical directions. The scanner 253 is a MEMS and includes a micromirror rotatable in two-dimensional directions so that the parallel light received thereat is scanningly moved in two-dimensional directions. The parallel light scanningly moved in such a manner is imaged two dimensionally, whereby virtual pixels are generated. Light from the virtual pixles is transmitted through the relay optical system 254, which is a related-art relay optical system, thereby becoming parallel light, and the parallel light enters the optical device 120.

The optical device 120 that receives, guides, and outputs the parallel light from the relay optical system 254 has the same configuration as the optical device 120 of the first exemplary embodiment, and detailed description thereof is therefore omitted. The head-mounted display apparatus of the second exemplary embodiment also has substantially the same configuration as in the first exemplary embodiment except for the image generator 210, as described above, and detailed description thereof is therefore omitted.

A third exemplary embodiment is another variation of the first exemplary embodiment. FIG. 10A is a conceptual diagram of one of image display devices 300 included in a head-mounted display apparatus according to the third exemplary embodiment. FIG. 10B is a schematic enlarged cross-sectional view showing a part of a reflective volume-hologram diffraction grating. The third exemplary embodiment employs the image generator 110 having the first configuration, as in the first exemplary embodiment, and an optical device (light-guiding means) 320 basically having the same configuration as the optical device 120 of the first exemplary embodiment, except for the configurations of the first deflector and the second deflector. The optical device 320 includes the following:

(A-2-1) a light-guiding plate 321 causing the light received from the image generator 110 to propagate with total reflection thereinside before outputting the light toward the eye 41 of the observer;

(A-2-2) a first deflector 330 deflecting the light received by the light-guiding plate 321 so that the light is totally reflected inside the light-guiding plate 321; and (A-2-3) a second deflector 340 deflecting, a plurality of times, the light caused to propagate with total reflection inside the light-guiding plate 321 so that the light is output from the light-guiding plate 321.

The optical device 320 of the third exemplary embodiment has the second configuration. Specifically, the first deflector and the second deflector are provided on a surface of the light-guiding plate 321 (more specifically, a second surface 323 of the light-guiding plate 321). The first deflector diffracts the light received by the light-guiding plate 321, and the second deflector diffracts, a plurality of times, the light caused to propagate with total reflection inside the light-guiding plate 321. In this case, the first and second deflectors are diffraction grating elements, specifically, reflective diffraction grating elements, more specifically, reflective volume-hologram diffraction gratings. For convenience of description hereinafter, a first deflector constituted by a reflective volume-hologram diffraction grating will be referred to as a "first diffraction grating member 330", and a second deflector constituted by a reflective volume-hologram diffraction grating will be referred to as a "second diffraction grating member 340".

In the third exemplary embodiment and in a fourth exemplary embodiment described below, to accommodate diffraction reflections of a number P (specifically, P=3, corresponding to three colors of red, green, and blue) of kinds of light having a number P of different spectrum bands (or wavelengths), the first and second diffraction grating members 330 and 340 each include a number P of diffraction grating layers, as reflective volume-hologram diffraction gratings, that are stacked one on top of another. The diffraction grating layers are made of photopolymer material and each have a single pattern of interference fringes corresponding to one of the spectrum bands (or wavelengths). The diffraction grating layers are manufactured by a related-art method. Specifically, the first and second diffraction grating members 330 and 340 each have a structure in which a diffraction grating layer that diffracts and reflects red light, a diffraction grating layer that diffracts and reflects green light, and a diffraction grating layer that diffracts and reflects blue light are stacked. The interference fringes provided in the diffraction grating layers (diffraction optical elements) are arranged at a constant pitch and extend linearly in the Z-axis direction, where the axial direction of the first and second diffraction grating members 330 and 340 is defined as the Y-axis direction, and the direction of the normal to the first and second diffraction grating members 330 and 340 is defined as the X-axis direction. In FIGS. 10A and 11, the first and second diffraction grating members 330 and 340 are each shown as a single layer. With the configuration described above, light of the different spectrum bands (or wavelengths) can be diffracted and reflected by the first and second diffraction grating members 330 and 340 with an increased diffraction efficiency, a widened diffraction acceptance angle, and an optimized diffraction angle.

FIG. 10B is a schematic enlarged cross-sectional view showing a part of the reflective volume-hologram diffraction grating. The reflective volume-hologram diffraction grating has interference fringes provided at a slant angle $\phi$. The slant angle $\phi$ is an angle formed between the surface of the reflective volume-hologram diffraction grating and each of the interference fringes. The interference fringes extend inside the reflective volume-hologram diffraction grating, from one surface thereof to the other, and satisfies the Bragg conditions. Under the Bragg conditions, the following expression is satisfied:

$$m \cdot \lambda = 2 \cdot d \cdot \sin(\Theta) \quad (A)$$

where m denotes a positive integer, $\lambda$ denotes the wavelength, d denotes the pitch between grating planes (the interval between virtual planes containing the interference fringes in the direction of the normal thereto), and $\Theta$ denotes the supplementary angle with respect to the incidence angle at the interference fringe.

In a case where light is incident on the diffraction grating member at an incident angle $\psi$, the relationship between the supplementary angle $\Theta$, the slant angle $\phi$, and the incidence angle $\psi$ is expressed as follows:

$\Theta = 90° - (\phi + \psi)$                                  (B)

The first diffraction grating member 330, provided (bonded) on the second surface 323 of the light-guiding plate 321 as described above, diffracts and reflects the parallel light entering the light-guiding plate 321 through a first surface 322 of the light-guiding plate 321 so that the parallel light is totally reflected inside the light-guiding plate 321. The second diffraction grating member 340, provided (bonded) on the second surface 323 of the light-guiding plate 321 as described above, diffracts and reflects, a plurality of times, the parallel light caused to propagate with total reflection inside the light-guiding plate 321, and outputs the light, maintaining the form of parallel light, from the light-guiding plate 321 through the first surface 322.

Also in the light-guiding plate 321, parallel light having three colors of red, green and blue propagates with total reflection inside the light-guiding plate 321 and is subsequently output. Since the light guided by the light-guiding plate 321 travels inside the light-guiding plate 321 along a long optical path, the number of total reflections occurring before the light reaches the second diffraction grating member 340 varies with the angle of view. Specifically, among parallel rays that enter the light-guiding plate 321, some rays that enter the light-guiding plate 321 at angles toward the second diffraction grating member 340 cause less reflections than other rays that enter the light-guiding plate 321 at angles away from the second diffraction grating member 340. This is because, among the parallel rays that are diffracted and reflected by the first diffraction grating member 330, rays that enter the light-guiding plate 321 at angles toward the second diffraction grating member 340 form smaller angles with respect to the normal to the light-guiding plate 321 when striking the inner surfaces of the light-guiding plate 321 while propagating inside the light-guiding plate 321, than rays that enter the light-guiding plate 321 at angles away from the second diffraction grating member 340. In addition, the pattern of the interference fringes provided inside the second diffraction grating member 340 and the pattern of the interference fringes provided inside the first diffraction grating member 330 are symmetrical with respect to a virtual plane perpendicular to the axis of the light-guiding plate 321.

The fourth exemplary embodiment described below also employs the light-guiding plate 321 basically having the same configuration as the light-guiding plate 321 in the third exemplary embodiment.

The head-mounted display apparatus of the third exemplary embodiment has substantially the same configuration as in the first exemplary embodiment except for the optical device 320, as described above, and detailed description thereof is therefore omitted.

A fourth exemplary embodiment is a variation of the third exemplary embodiment. FIG. 11 is a conceptual diagram of one of image display devices 400 included in a head-mounted display apparatus according to the fourth exemplary embodiment. The image display device 400 of the fourth exemplary embodiment includes the light source 251, the collimating optical system 252, the scanner 253, the relay optical system 254, and so forth, having the same configurations as in the second exemplary embodiment. The fourth exemplary embodiment employs the optical device 320, the same configuration as in the third exemplary embodiment. Except for the foregoing points, the head-mounted display apparatus of the fourth exemplary embodiment has substantially the same configuration as in the first exemplary embodiment, and detailed description thereof is therefore omitted.

Figure 12:
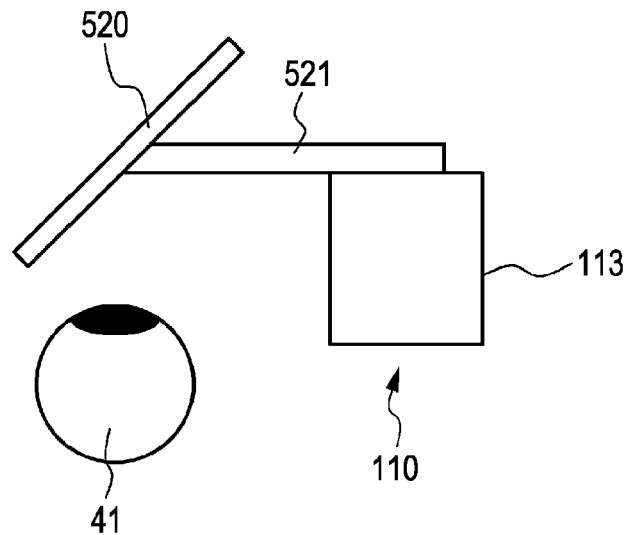
FIG. 12 is a conceptual diagram of an image display device included in a head-mounted display apparatus according to a fifth exemplary embodiment.

A fifth exemplary embodiment is another variation of the first exemplary embodiment. FIG. 12 is a conceptual diagram of one of image display devices included in a head-mounted display apparatus according to the fifth exemplary embodiment. The fifth exemplary embodiment employs an optical device having the third configuration. Specifically, the optical device includes a transflective mirror 520 receiving light from the image generator 110 and outputting the light toward the eye 41 of the observer. In the fifth exemplary embodiment, the light output from the image generator 110 propagates inside a transparent member 521, such as a glass plate or a plastic plate, and enters the transflective mirror 520. Alternatively, the light output from the image generator 110 may propagate in the air before entering the transflective mirror 520. In addition, the image generator 110 may be replaced with the image generator 210 described in the second exemplary embodiment. Except for the foregoing points, the head-mounted display apparatus of the fifth exemplary embodiment has substantially the same configuration as in the first exemplary embodiment, and detailed description thereof is therefore omitted.

While the present application has been described with reference to preferred embodiments, the present application is not limited thereto. The head-mounted display apparatuses, the image display devices, the wearing devices, the attachment members, the support members, the retaining members, and the urging members described in the above embodiments are only exemplary and can be changed appropriately. For example, the number of grooves provided in the support member, the number of grooves provided in the retaining member, and the number of balls may alternatively be four or more. Surface-relief hologram grating members (refer to US Patent No. 20040062505 A1) may alternatively be provided on the light-guiding plate. In the third and fourth exemplary embodiment, the optical device 320 may alternatively include transmissive diffraction grating elements, or a reflective diffraction grating element for one of the first and second deflectors and a transmissive diffraction grating element for the other. As another alternative, the diffraction grating elements may be reflective blazed diffraction grating elements.

Figure 13:
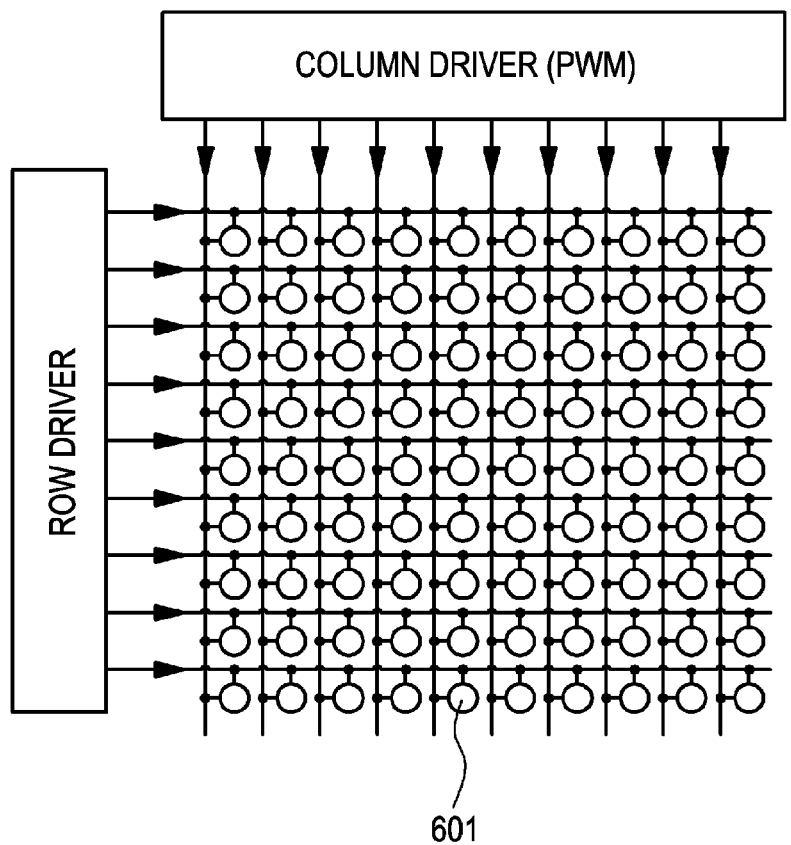
FIG. 13 is a conceptual diagram of an image-forming device suitable for use as a variation of each of image-forming devices in the first, third, and fifth exemplary embodiments.

FIG. 13 is a conceptual diagram of an active-matrix image-forming device suitable for use as a variation of each of the image-forming devices in the first, third, and fifth exemplary embodiments. The active-matrix image-forming device includes a light-emitting panel on which light-emitting elements 601, which are semiconductor light-emitting elements, are arranged in a two-dimensional matrix. An image is displayed by controlling the light-emitting elements 601 to individually switch between emitting and non-emitting states so that the states of emission of the light-emitting elements 601 are directly observed. Light emitted from the image-forming device travels through the collimating optical system 112 and enters the light-guiding plate 121 or 321.

Figure 14:
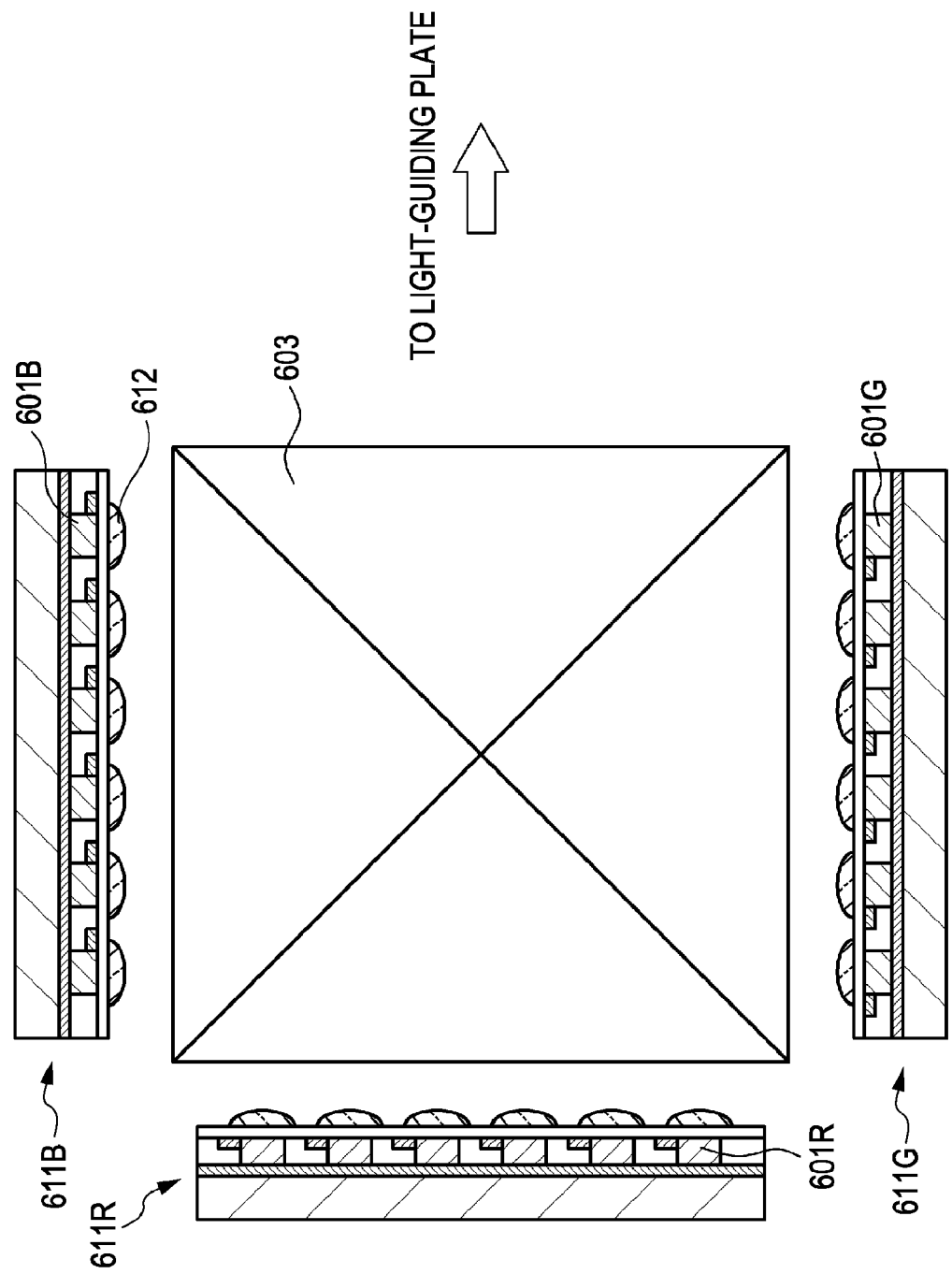
FIG. 14 is a conceptual diagram of an image-forming device suitable for use as another variation of each of the image-forming devices in the first, third, and fifth exemplary embodiments.

Alternatively, referring to a conceptual diagram shown in FIG. 14, there may be employed an image-forming device including the following:

(α) a red-light-emitting panel 611R on which red-light-emitting elements 601R that emit red light are arranged in a two-dimensional matrix;

(β) a green-light-emitting panel 611G on which green-light-emitting elements 601G that emit green light are arranged in a two-dimensional matrix;

(γ) a blue-light-emitting panel 611B on which blue-light-emitting elements 601B that emit blue light are arranged in a two-dimensional matrix; and (δ) means (for example, a dichroic prism 603) for combining light emitted from the red-, green-, and blue-light-emitting panels 611R, 611G, and 611B into a single ray of light.

The image-forming device displays a color image by controlling the red-, green-, and blue-light-emitting elements 601R, 601G, and 601B to individually switch between emitting and non-emitting states. Light emitted from this image-forming device also travels through the collimating optical system 112 and enters the light-guiding plate 121 or 321. The image-forming device also includes microlenses 612 that condenses light emitted from the light-emitting elements 601R, 601G, and 601B.

Figure 15:
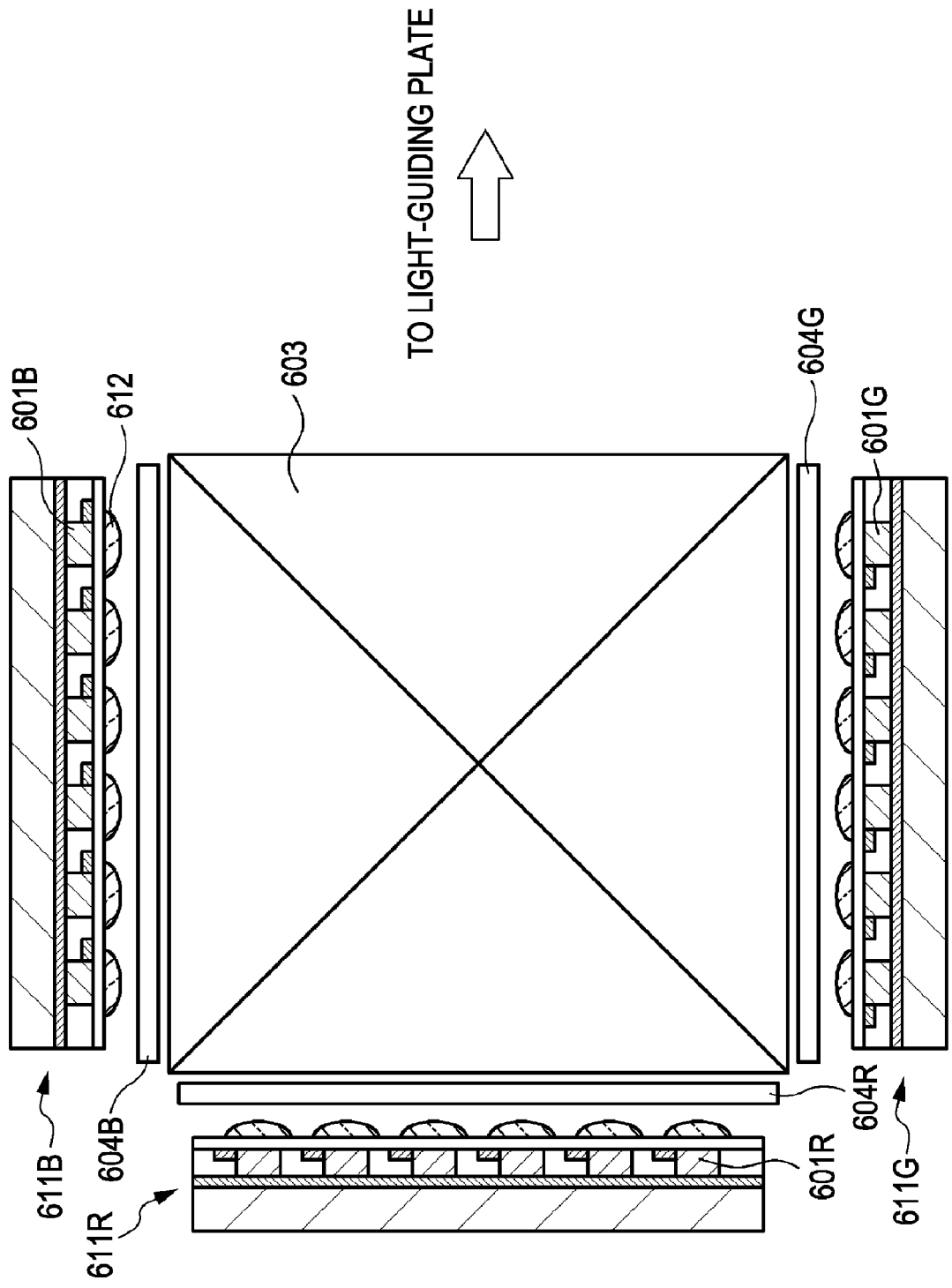
FIG. 15 is a conceptual diagram of an image-forming device suitable for use as yet another variation of each of the image-forming devices in the first, third, and fifth exemplary embodiments.

FIG. 15 is a conceptual diagram of another alternative image-forming device including the light-emitting panels 611R, 611G, and 611B on which the light-emitting elements 601R, 601G, and 601B are arranged in two-dimensional matrices, respectively. Light emitted from the light-emitting panels 611R, 611G, and 611B is controlled by light-passage control devices 604R, 604G, and 604B to pass therethrough or to be blocked thereby. The light that has passed through the light-passage control devices 604R, 604G, and 604B enters the dichroic prism 603, thereby being combined into a single ray of light. The light further travels through the collimating optical system 112, and enters the light-guiding plate 121 or 321.

Figure 16:
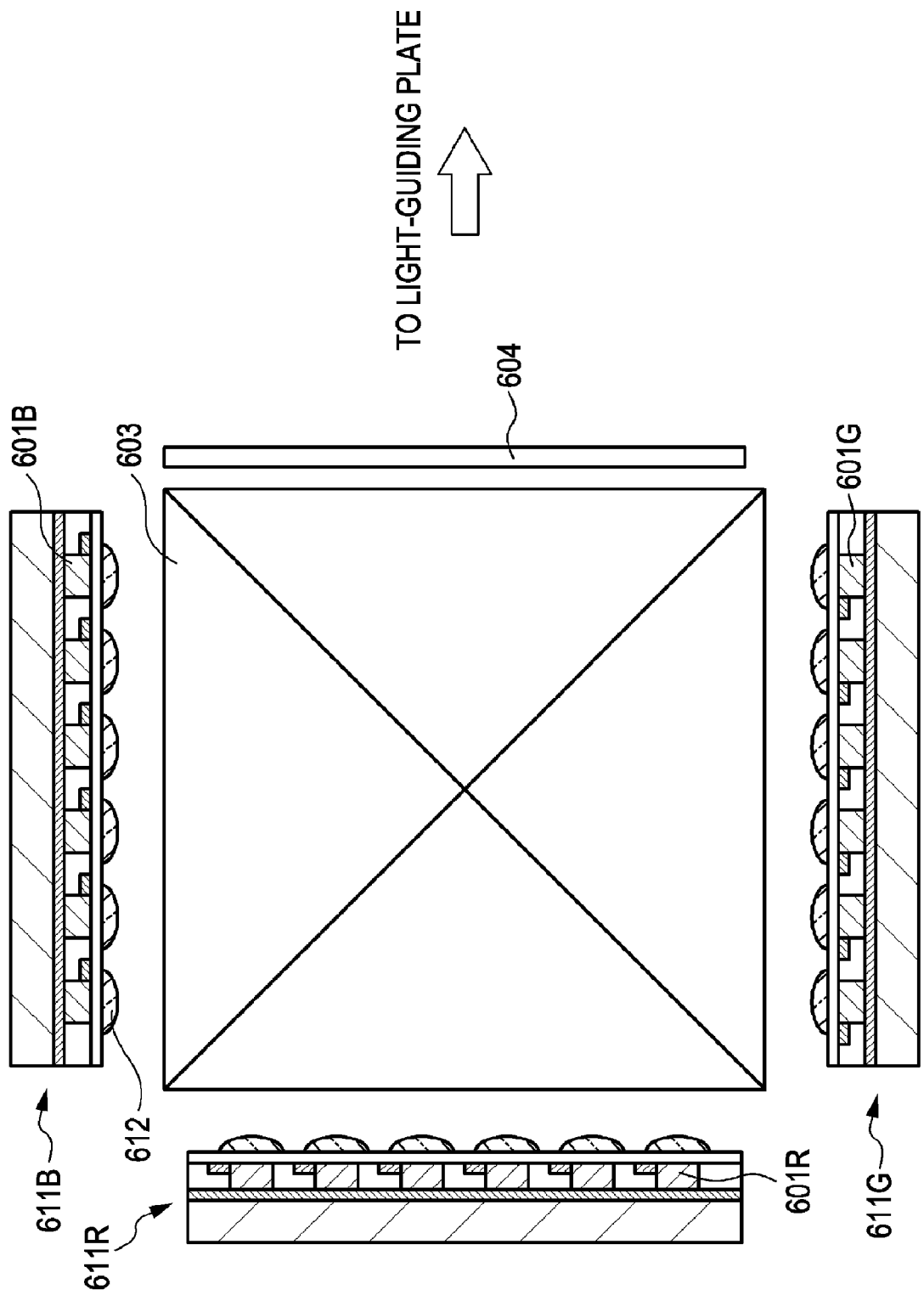
FIG. 16 is a conceptual diagram of an image-forming device suitable for use as yet another variation of each of the image-forming devices in the first, third, and fifth exemplary embodiments.

FIG. 16 is a conceptual diagram of another alternative image-forming device including the light-emitting panels 611R, 611G, and 611B on which the light-emitting elements 601R, 601G, and 601B are arranged in two-dimensional matrices, respectively. Light emitted from the light-emitting panels 611R, 611G, and 611B enters the dichroic prism 603, thereby being combined into a single ray of light. The light output from the dichroic prism 603 is controlled by a light-passage control device 604 to pass therethrough or to be blocked thereby. The light that has passed through the light-passage control device 604 further travels through the collimating optical system 112, and enters the light-guiding plate 121 or 321.

Figure 17:
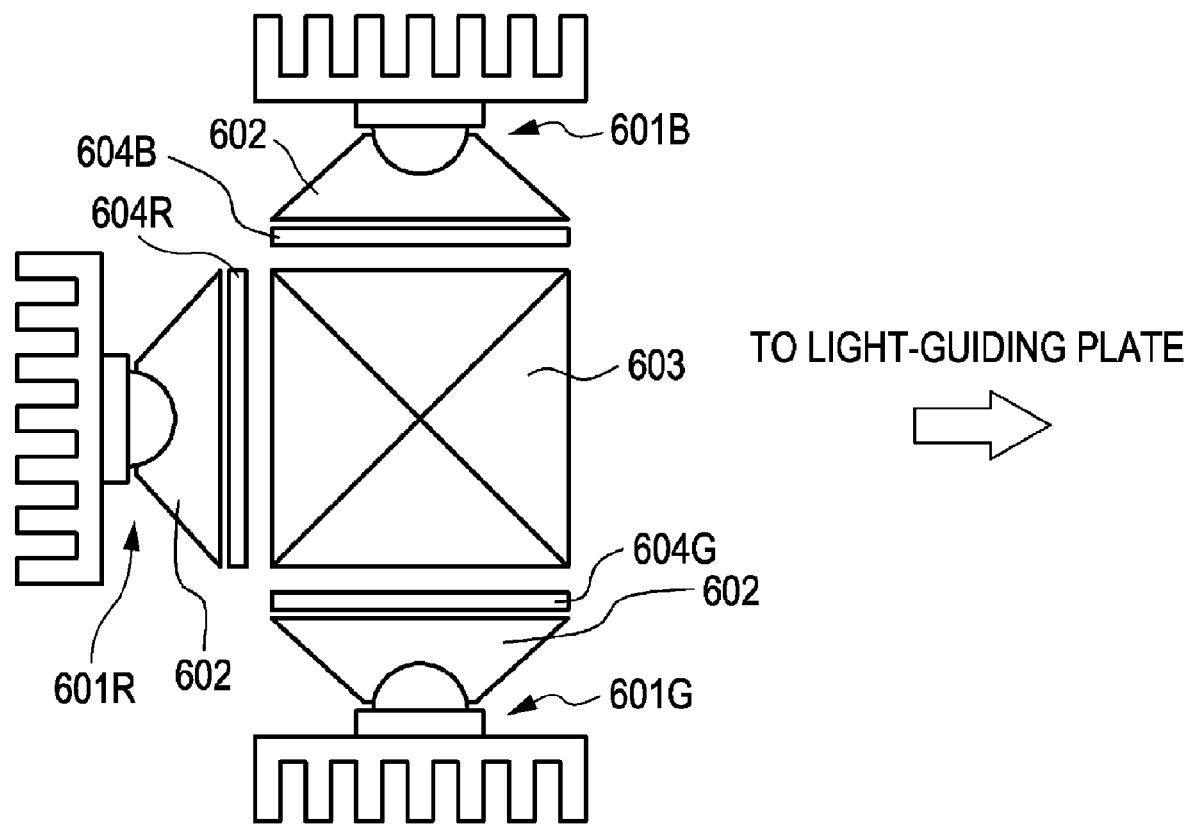
FIG. 17 is a conceptual diagram of an image-forming device suitable for use as yet another variation of each of the image-forming devices in the first, third, and fifth exemplary embodiments.

FIG. 17 shows another alternative image-forming device. The image-forming device includes a light-emitting element 601R that emits red light; a light-passage control device (for example, a liquid crystal display device 604R), which is a kind of a light valve that controls the light emitted from the light-emitting element 601R to pass therethrough or to be blocked thereby; a light-emitting element 601G that emits green light; a light-passage control device (for example, a liquid crystal display device 604G), which is a kind of a light valve that controls the light emitted from the light-emitting element 601G to pass therethrough or to be blocked thereby; a light-emitting element 601B that emits blue light; a light-passage control device (for example, a liquid crystal display device 604B), which is a kind of a light valve that controls the light emitted from the light-emitting element 601B to pass therethrough or to be blocked thereby; light-guiding members 602 that guide the light emitted from the respective light-emitting elements 601R, 601G, and 601B, which are GaN-based semiconductor elements; and means (for example, the dichroic prism 603) for combining the light from the light-emitting elements 601R, 601G, and 601B into a single ray of light.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A head-mounted display apparatus comprising:
an image display device;
a wearing device with which the image display device is worn on a head of an observer; and
an attachment member with which the image display device is attached to the wearing device,
wherein the attachment member includes
a first balls;
a support member having a first linear groove;
a retaining member having a fourth linear groove extending in a different direction from the first groove; and
urging means urging the retaining member against the support member,
wherein, in a state where the retaining member is urged against the support member by the urging means, the first ball fits into the first and fourth grooves,
wherein the image display device is attached to the support member, and
wherein the wearing device is attached to the retaining member.

2. The head-mounted display apparatus according to claim 1, wherein the first linear groove and the fourth linear groove include consecutive depressions respectively.

3. A head-mounted display apparatus comprising:
an image display device; a wearing device with which the image display device is worn on a head of an observer; and
an attachment member with which the image display device is attached to the wearing device,
wherein the attachment member includes
first, second, and third balls;
a support member having a first linear groove including consecutive depressions, a second linear groove parallel to the first groove and including consecutive depressions, and a third linear groove parallel to the first groove and including consecutive depressions;
a retaining member having a fourth linear groove orthogonal to the first groove and including consecutive depressions, a fifth linear groove parallel to the fourth groove and including consecutive depressions, and a sixth linear groove parallel to the fourth groove and including consecutive depressions; and
urging means urging the retaining member against the support member, wherein, in a state where the retaining member is urged against the support member by the urging means, the first ball fits into the first and fourth grooves, the second ball fits into the second and fifth grooves, and the third ball fits into the third and sixth grooves, with the first to third balls being positioned at respective apexes of a virtual triangle,
wherein the image display device is attached to the support member, and
wherein the wearing device is attached to the retaining member.

4. The head-mounted display apparatus according to claim 3, wherein a guide member is provided between the support member and the retaining member, the guide member having receiving portions that receive the first to third balls, respectively.

5. The head-mounted display apparatus according to claim 3, wherein the first and fourth grooves are spot-faced so that the first ball is received stably, wherein the second and fifth grooves are spot-faced so that the second ball is received stably, and wherein the third and sixth grooves are spot-faced so that the third ball is received stably.

6. The head-mounted display apparatus according to claim 3, wherein the image display device and the attachment member are provided for each of right and left eyes.

7. The head-mounted display apparatus according to claim 3, wherein the image display device includes an image generator; and an optical device receiving light from the image generator, guiding the light, and outputting the light toward a corresponding one of the eyes of the observer.

8. The head-mounted display apparatus according to claim 7, wherein the optical device includes a light-guiding plate causing the received light to propagate with total reflection thereinside before outputting the light; first deflecting means deflecting the light received by the light-guiding plate so that the light is totally reflected inside the light-guiding plate; and second deflecting means deflecting, a plurality of times, the light caused to propagate with total reflection inside the light-guiding plate so that the light is output from the light-guiding plate.

9. The head-mounted display apparatus according to claim 8, wherein the first deflecting means reflects the light received by the light-guiding plate, and wherein the second deflecting means transmits and reflects, a plurality of times, the light caused to propagate with total reflection inside the light-guiding plate.

10. The head-mounted display apparatus according to claim 9, wherein the first deflecting means functions as a reflective mirror, and wherein the second deflecting means functions as a transflective mirror.

11. The head-mounted display apparatus according to claim 8, wherein the first deflecting means diffracts the light received by the light-guiding plate, and wherein the second deflecting means diffracts, a plurality of times, the light caused to propagate with total reflection inside the light-guiding plate.

12. The head-mounted display apparatus according to claim 11, wherein the first and second deflecting means include diffraction grating elements.

13. The head-mounted display apparatus according to claim 12, wherein the diffraction grating elements are reflective diffraction grating elements.

14. The head-mounted display apparatus according to claim 12, wherein the diffraction grating elements are transmissive diffraction grating elements.

15. The head-mounted display apparatus according to claim 12, wherein one of the diffraction grating elements is a reflective diffraction grating element and the other is a transmissive diffraction grating element.

16. The head-mounted display apparatus according to claim 7, wherein the optical device includes a transflective minor receiving the light from the image generator and outputting the light toward the eye of the observer.

17. The head-mounted display apparatus according to claim 7, wherein the image generator includes an image-forming device having a plurality of pixels arranged in a two-dimensional matrix; and a collimating optical system collimating the light from the pixels of the image-forming device into parallel light and outputting the parallel light.

18. The head-mounted display apparatus according to claim 7, wherein the image generator includes a light source; a collimating optical system collimating light from the light source into parallel light; scanning means scanningly moving the parallel light from the collimating optical system; and a relay optical system relaying and outputting the parallel light scanningly moved by the scanning means.

19. The head-mounted display apparatus according to claim 3, wherein the wearing device forms a frame of a pair of glasses.

20. The head-mounted display apparatus according to claim 19, wherein the frame includes a front member to be positioned in front of the observer; and two temples turnably attached to respective ends of the front member with hinges, and wherein the attachment member is attached to each of the ends of the front member.

* * * * *